US012646744B2

(12) United States Patent
Yamada et al.

(10) Patent No.: US 12,646,744 B2
(45) Date of Patent: Jun. 2, 2026

(54) SOLID ELECTROLYTE PRODUCTION METHOD

(71) Applicant: IDEMITSU KOSAN CO., LTD., Tokyo (JP)

(72) Inventors: Hiroaki Yamada, Chiba (JP); Yusuke Iseki, Chiba (JP); Fumio Yamakawa, Ichihara (JP); Masao Aida, Ichihara (JP); Shinji Tanaka, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 790 days.

(21) Appl. No.: 17/924,422

(22) PCT Filed: May 12, 2021

(86) PCT No.: PCT/JP2021/018031
§ 371 (c)(1),
(2) Date: Nov. 10, 2022

(87) PCT Pub. No.: WO2021/230281
PCT Pub. Date: Nov. 18, 2021

(65) Prior Publication Data
US 2023/0187688 A1 Jun. 15, 2023

(30) Foreign Application Priority Data

May 13, 2020 (JP) ................................. 2020-084793
May 26, 2020 (JP) ................................. 2020-091347

(51) Int. Cl.
H01M 10/0562 (2010.01)
C01B 25/14 (2006.01)

(52) U.S. Cl.
CPC ......... H01M 10/0562 (2013.01); C01B 25/14 (2013.01); C01P 2002/54 (2013.01); C01P 2002/72 (2013.01); C01P 2002/82 (2013.01); C01P 2006/40 (2013.01); H01M 2300/0068 (2013.01)

(58) Field of Classification Search
CPC ...... H10M 10/0562; H10M 2300/0068; C01B 25/14; C01P 2002/54; C01P 2002/72; C01P 2002/82; C01P 2006/40
See application file for complete search history.

(56) References Cited

U.S. PATENT DOCUMENTS 11,139,505 B2 * 10/2021 Shibata ...................... H01B 1/06
11,746,014 B2 * 9/2023 Iseki ......................... H01B 1/06
429/304
11,978,848 B2 * 5/2024 Tanaka ................... C01D 15/00
12,199,236 B2 * 1/2025 Shibata ............. H01M 10/0585

FOREIGN PATENT DOCUMENTS

JP        2014191899 A    10/2014
WO     WO-2014192309 A1   12/2014
WO     WO-2017159666 A1    9/2017
WO     WO-2017159667 A1    9/2017
WO     WO-2018054709 A1    3/2018
WO     WO-2018110647 A1    6/2018

OTHER PUBLICATIONS

Hood et al., "Fabrication of Sub-Micrometer-THick Solid Electrolyte Membranes of b-Li3PS4 via Tiled Assembly of Nanoscale, Plate-Like Building Blocks", Advanced Energy Materials, vol. 8, No. 21, 1800014, 2018, pp. 1-7, May 7, 18.*
Extended European Search Report issued May 22, 2024 in corresponding European Patent Application No. 21803169.8, 9 pages.
Xu, J., et al., "Liquid-involved synthesis and processing of sulfide-based solid electrolytes, electrodes, and all-solid-state batteries", Materials Today NANO, vol. 8, Dec. 1, 2019 (Dec. 1, 2019), p. 100048, XP093161021, ISSN: 2588-8420, DOI: 10.1016/j.mtnano.2019.100048 * the whole document*.
Hood, Z.D., et al., "Fabrication of Sub-Micrometer-Thick Solid Electrolyte Membranes of [beta] Li 3 PS 4 via Tiled Assembly of Nanoscale, Plate-Like Building Blocks", Advanced Energy Materials, vol. 8, No. 21, May 7, 2018 (May 7, 2018), XP093161034, Retrieved from the Internet: URL:https://onlinelibrary.wiley.com/doi/fullxml/.
Yubuchi, S., et al., "An argyrodite sulfide-based superionic conductor synthesized by a liquid-phase technique with tetrahydrofuran and ethanol", Journal of Materials Chemistry A, vol. 7, No. 2, Jan. 1, 2019 (Jan. 1, 2019), pp. 558-566, XP093161025, Retrieved from the Internet: URL:http://pubs.rsc.org/en/Content/articlepdf/ZOI9/TA/C8TA09477B
International Search Report issued Jul. 27, 2021 in PCT/JP2021/018031 (with English translation), 5 pages.
Stefan J. Sedlmaier et al, "Li4PS4I: A Li+ Superionic Conductor Synthesized by a Solvent-Based Soft Chemistry Approach", Chemistry of Materials, 2017, No. 29, pp. 1830 to 1835.

* cited by examiner

*Primary Examiner* — C Melissa Koslow
(74) *Attorney, Agent, or Firm* — Element IP, PLC

(57) ABSTRACT

Provided is a method of producing a solid electrolyte having high ionic conductivity using a liquid phase method, including a first step of mixing two or more compounds satisfying (1) and a complexing agent 1 satisfying (2), and a second step of further mixing in a complexing agent 2 satisfying (3) after the first step. (1) A compound containing one or more selected from a group consisting of a lithium element, a sulfur element, a phosphorus element and a halogen element. (2) A complexing agent capable of forming a complex containing $Li_3PS_4$ and a halogen element. (3) A complexing agent other than the complexing agent 1, capable of forming a complex containing $Li_3PS_4$.

16 Claims, 4 Drawing Sheets

[Fig. 1]
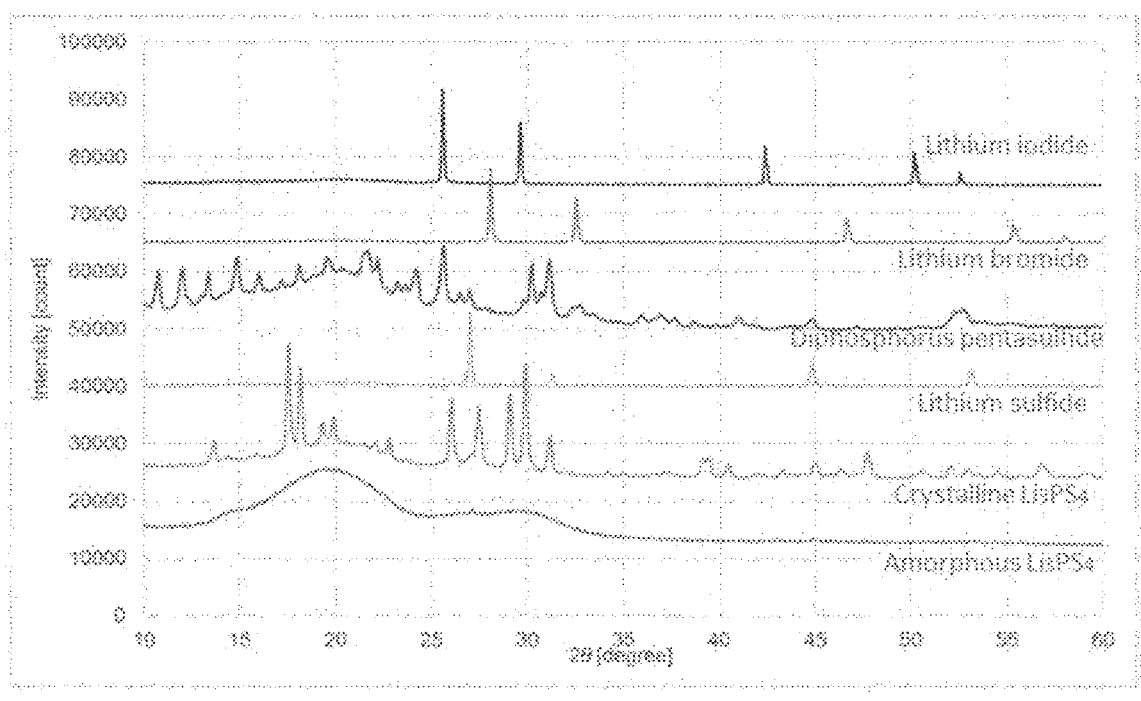
[Fig. 2]

[Fig. 3]
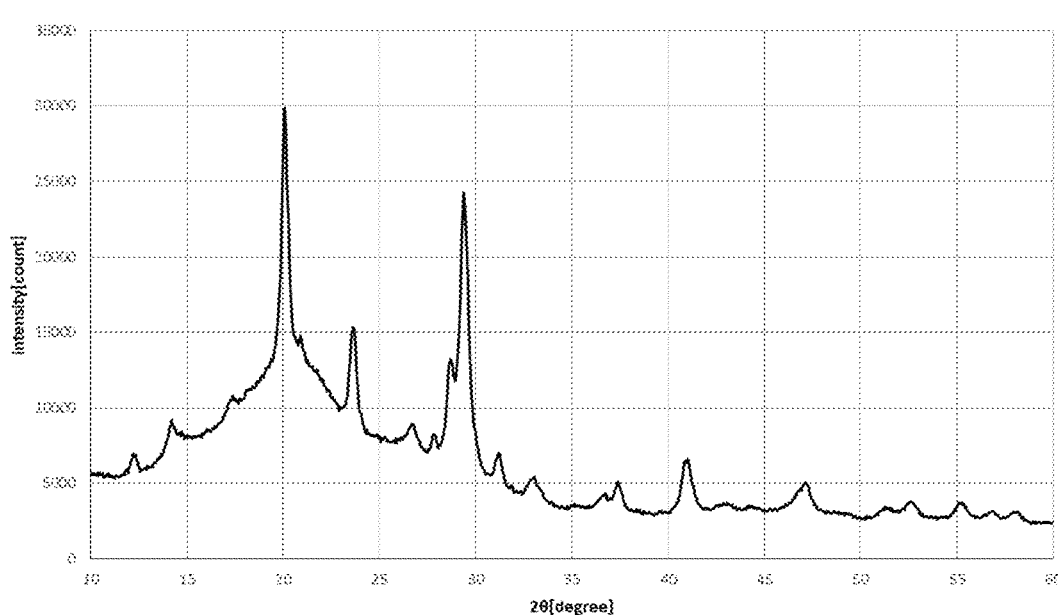
[Fig. 4]
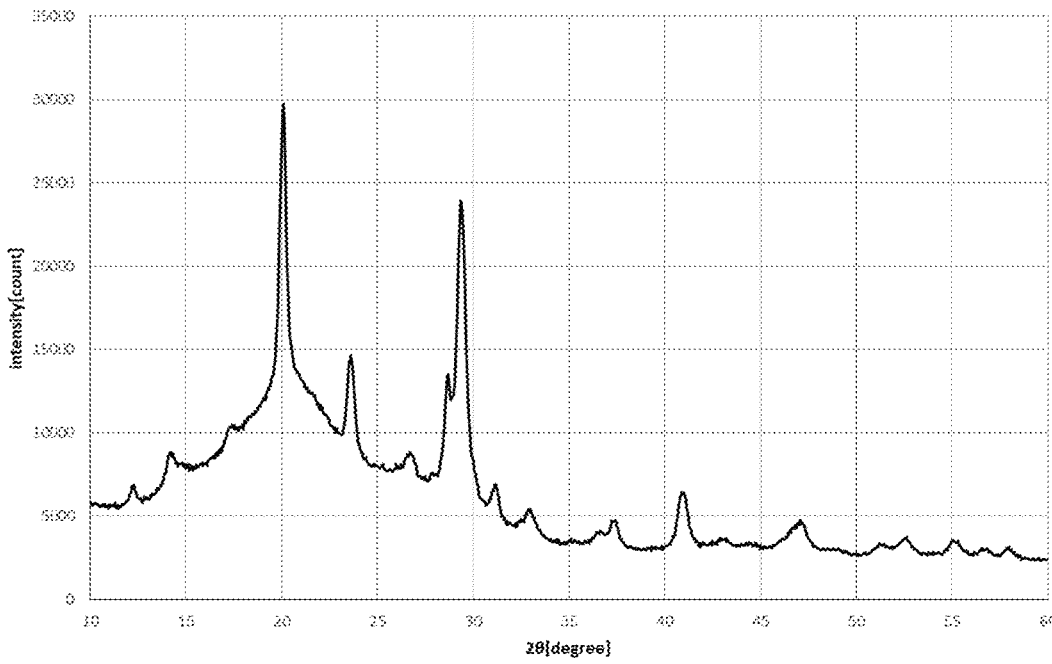

[Fig. 5]
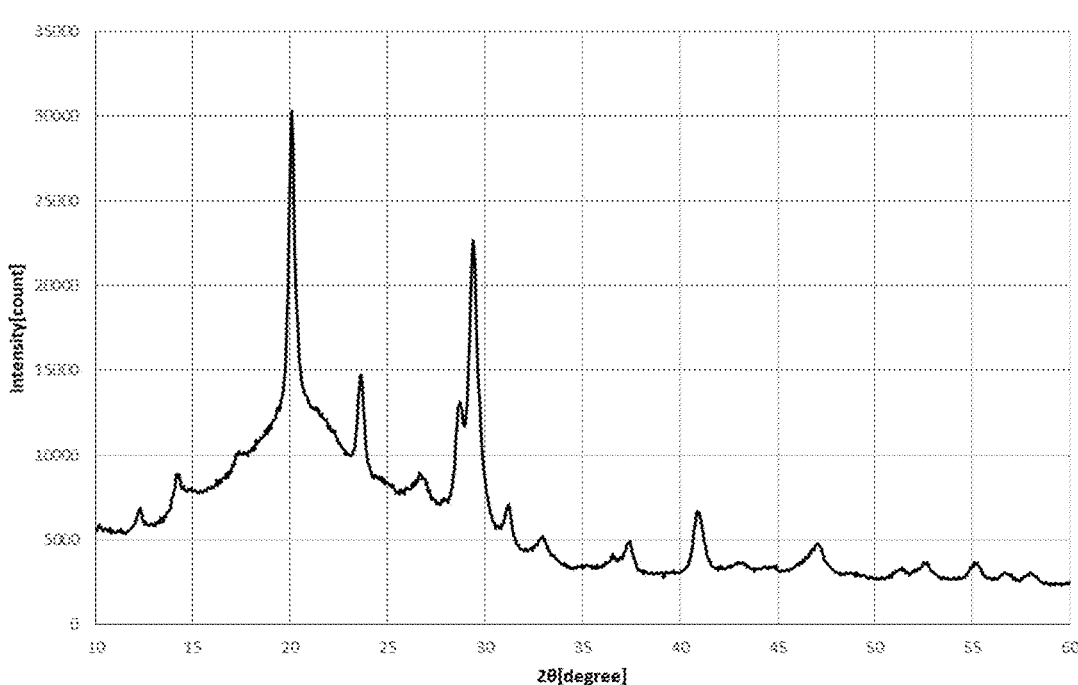
[Fig. 6]
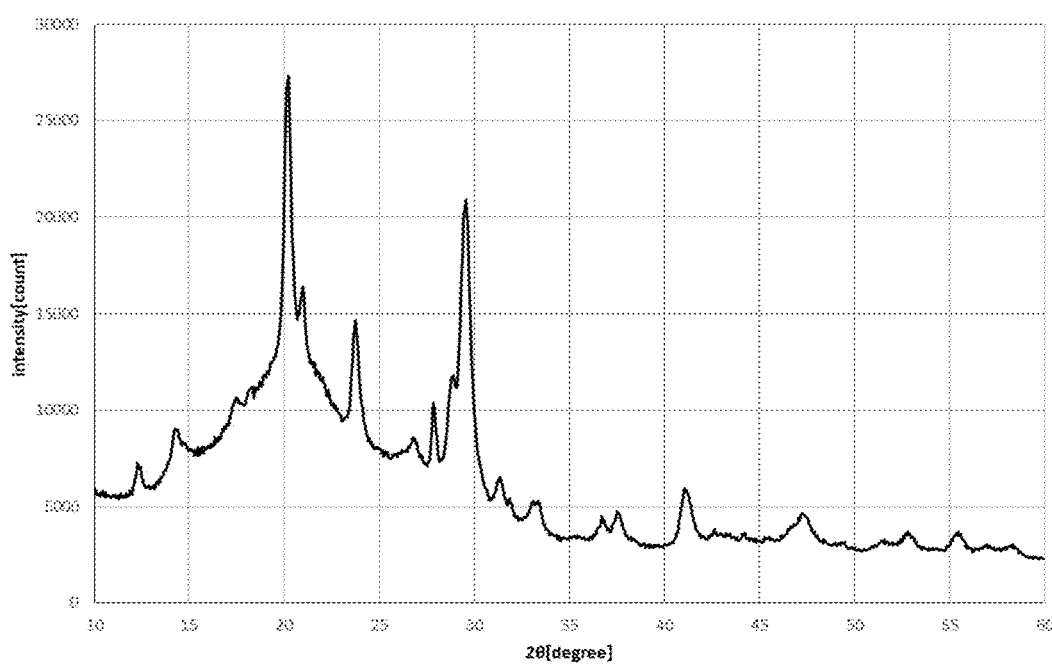

[Fig. 7]
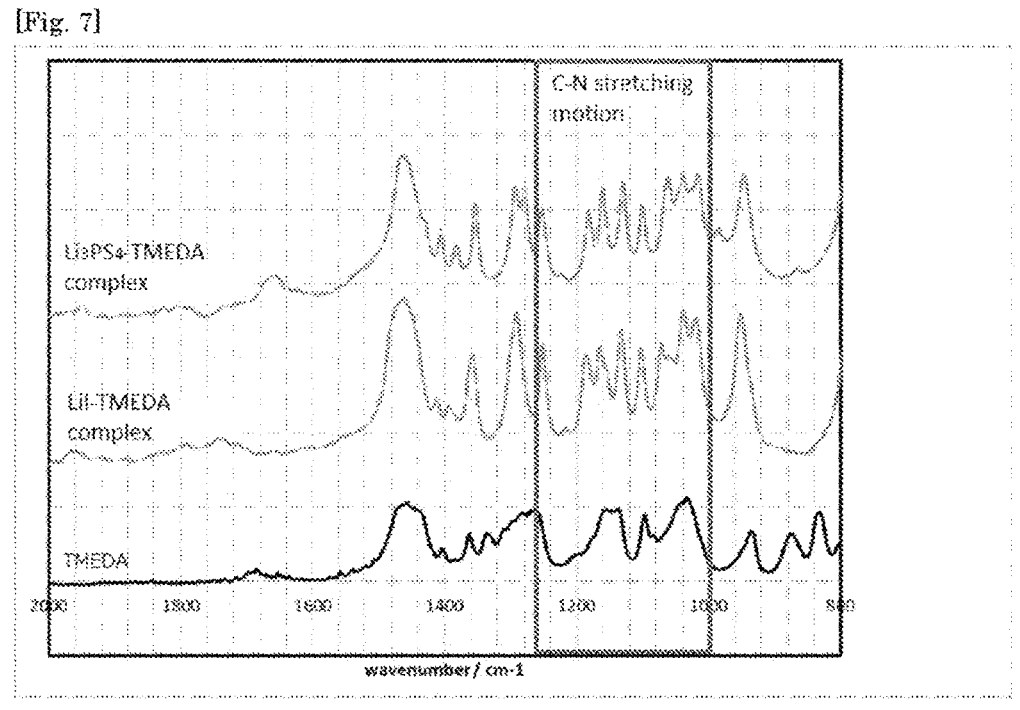

SOLID ELECTROLYTE PRODUCTION METHOD

TECHNICAL FIELD

The present invention relates to a method of producing a solid electrolyte.

BACKGROUND ART

With rapid spread of information-related instruments, communication instruments, and so on, such as personal computers, video cameras, and mobile phones, in recent years, development of batteries that are utilized as a power source therefor is considered to be important. Heretofore, in batteries to be used for such an application, an electrolytic solution containing a flammable organic solvent has been used. However, development of batteries having a solid electrolyte layer in place of an electrolytic solution is being made in view of the fact that by making the battery fully solid, simplification of a safety unit may be realized without using a flammable organic solvent within the battery, and the battery is excellent in manufacturing costs and productivity.

Methods of producing a solid electrolyte used in the solid electrolyte layer are broadly divided into solid-phase methods and liquid-phase methods. Moreover, the liquid-phase method includes a homogeneous method in which a solid electrolyte material is completely dissolved in a solvent and a heterogeneous method in which the solid electrolyte material passes through a solid-liquid coexistent suspension without being completely dissolved. For example, as a solid-phase method, there has been known a method of producing an amorphous or crystalline solid electrolyte by subjecting raw materials such as lithium sulfide and diphosphorus pentasulfide to mechanical milling using equipment such as a ball mill and a bead mill, followed by heat treatment as necessary (see, for example, PTL 1). According to the method, a solid electrolyte can be obtained by applying mechanical stress to a raw material such as lithium sulfide to promote a reaction between solids.

On the other hand, as a homogeneous method among the liquid phase methods, a method of dissolving a solid electrolyte in a solvent and redepositing the solid electrolyte has been known (see, for example, PTL 2), and as a heterogeneous method, a method of reacting a solid electrolyte raw material such as lithium sulfide in a solvent containing a polar aprotic solvent has been known (see PTLs 3 and 4, and NPL 1). For example, PTL 4 discloses a method of producing a solid electrolyte having an $Li_4PS_4I$ structure including a step of using dimethoxyethane (DME) and combining dimethoxyethane with a $Li_3PS_4$ structure to obtain $Li_3PS_4 \cdot DME$. The ionic conductivity of the obtained solid electrolyte is $5.5 \times 10^{-5}$ S/cm ($3.9 \times 10^{-4}$ S/cm when calcium is doped). In recent years, toward the practical use of all-solid-state batteries, the liquid-phase method has attracted attention as a method that can be easily synthesized in large quantities in addition to its versatility and applicability.

CITATION LIST

Patent Literature

PTL 1: WO 2017/159667 A
PTL 2: JP 2014-191899 A
PTL 3: WO 2014/192309 A
PTL 4: WO 2018/054709 A

Non Patent Literature

NPL 1: "CHEMISTRY OF MATERIALS", 2017, No. 29, Pages 1830 to 1835

SUMMARY OF INVENTION

Technical Problem

However, the conventional solid-phase method, which involves mechanical milling, etc., mainly involves solid-phase reactions, and because it is easy to obtain a solid electrolyte with high purity, high ionic conductivity can be achieved. In contrast, in the liquid-phase method, since the solid electrolyte is dissolved, it is difficult to achieve high ionic conductivity compared to the solid-phase synthesis method because some of the solid electrolyte components are decomposed or lost during deposition.

For example, in the homogenous method, the components can be uniformly dispersed in the liquid because the raw materials and the solid electrolyte are once completely dissolved. However, in the subsequent deposition step, since deposition proceeds according to the solubility specific to each component, it is extremely difficult to deposit the components while maintaining the dispersed state of the components. As a result, each component separates and deposits. In addition, in the homogeneous method, the affinity between the solvent and lithium becomes too strong, and thus it is difficult to remove the solvent even if it is dried after deposition. For these reasons, the homogeneous method has a problem that the ionic conductivity of the solid electrolyte is greatly reduced.

Also, even in the heterogeneous method of solid-liquid coexistence, a part of the solid electrolyte dissolves, and separation occurs due to elution of specific components, making it difficult to obtain a desired solid electrolyte.

In view of the aforementioned circumstances, the present invention has been made, and an object thereof is to provide a production method of efficiently obtaining a solid electrolyte having high ionic conductivity using a liquid-phase method.

Solution to Problem

In order to solve the aforementioned problem, the present inventor made extensive and intensive investigations. As a result, the present inventor found the following facts and completed the present invention.

1. In the presence of a complexing agent 1 capable of forming a $Li_3PS_4$ and capable of forming a complex containing the formed $Li_3PS_4$ and a halogen element, when $Li_2S$, $P_2S_5$, etc., which are raw materials for the solid electrolyte, are mixed, $Li_3PS_4$ is formed. Furthermore, a complex containing the formed $Li_3PS_4$ and a halogen element is formed, and the dispersed state of various raw materials is maintained uniformly. Therefore, even after the deposition step, a solid electrolyte precursor in which each main component is uniformly dispersed can be obtained, and finally a crystalline solid electrolyte with high lithium ionic conductivity can be obtained.

2. The formation reaction of $Li_3PS_4$ by the complexing agent 1 stagnates after progressing to a certain extent.

3. After starting the reaction with complexing agent 1, by further adding a complexing agent 2, which has a higher rate of $Li_3PS_4$ formation compared to the complexing agent 1, the formation reaction of $Li_3PS_4$, which would stagnate with the complexing agent 1 alone, advances without stagnation.

In other words, the inventor found that the problem can be solved by the following invention.

[1] A method of producing a solid electrolyte, including a first step of mixing two or more compounds satisfying the following (1) and a complexing agent 1 satisfying the following (2), and a second step of further mixing in a complexing agent 2 satisfying the following (3) after the first step, wherein said two or more compounds satisfying (1), taken together, comprise all of a lithium element, a sulfur element, a phosphorus element and a halogen element.

(1) A compound containing one or more selected from a group consisting of a lithium element, a sulfur element, a phosphorus element and a halogen element.

(2) A complexing agent capable of forming a complex containing $Li_3PS_4$ and a halogen element.

(3) A complexing agent other than the complexing agent 1, capable of forming a complex containing $Li_3PS_4$.

[2] The method of producing a solid electrolyte according to [1], wherein the complexing agent 1 contains a nitrogen element.

[3] The method of producing a solid electrolyte according to [1] or [2], wherein the complexing agent 2 contains an oxygen element.

[4] The method of producing a solid electrolyte according to any one of [1] to [3], wherein the complexing agent 1 has two or more amino groups.

[5] The method of producing a solid electrolyte according to any one of [1] to [4], wherein the complexing agent 2 has one or more groups selected from a group consisting of an ether group and an ester group.

[6] The method of producing a solid electrolyte according to any one of [1] to [5], wherein the complexing agent 1 is tetramethylethylenediamine.

[7] The method of producing a solid electrolyte according to any one of [1] to [6], wherein the complexing agent 2 is tetrahydrofuran.

[8] The method of producing a solid electrolyte according to any one of [1] to [6], wherein the complexing agent 2 is dimethoxyethane.

[9] The method of producing a solid electrolyte according to any one of [1] to [8], wherein the complexing agent 1 is added in an amount with a molar ratio of 0.1 or more and 2.0 or less with respect to a total molar amount of Li atoms contained in two or more compounds satisfying the above (1).

[10] The method of producing a solid electrolyte according to any one of [1] to [9], wherein the complexing agent 2 is added in an amount with a molar ratio of 1.0 or more and 5.0 or less with respect to a total molar amount of $Li_3PS_4$ that can be produced from two or more compounds satisfying the above (1).

[11] The method of producing a solid electrolyte according to any one of [1] to [10], wherein a compound satisfying the above (1) contains lithium halide.

[12] The method of producing a solid electrolyte according to any one of [1] to [11], wherein a compound satisfying the above (1) contains a single halogen.

[13] The method of producing a solid electrolyte according to any one of [1] to [12], wherein the halogen element is a bromine element and an iodine element.

[14] The method of producing a solid electrolyte according to any one of [1] to [13], wherein a compound satisfying the above (1) includes lithium sulfide and diphosphorus pentasulfide.

[15] The method of producing a solid electrolyte according to any one of [1] to [14], wherein a compound satisfying the above (1) includes $Li_3PS_4$.

[16] The method of producing a solid electrolyte according to any one of [1] to [15], wherein pulverization mixing is not performed in the first step.

[17] The method of producing a solid electrolyte according to any one of [1] to [16], wherein the solid electrolyte contains a thio-LISICON Region II-type crystal structure.

[18] The method of producing a solid electrolyte according to any one of [1] to [17], wherein the solid electrolyte does not have diffraction peaks at $2\theta=17.5°$ and $26.1°$ in an X-ray diffractometry using a CuKα ray.

Advantageous Effects of Invention

In accordance with the present invention, a production method of efficiently obtaining a solid electrolyte having high ionic conductivity using a liquid-phase method can be provided.

BRIEF DESCRIPTION OF DRAWINGS

FIG. 1 is an X-ray diffraction spectrum of each of an electrolyte precursor, an amorphous solid electrolyte, and a crystalline solid electrolyte obtained in Example 1.

FIG. 2 is an X-ray diffraction spectrum of each of raw materials used in Examples and Comparative Examples.

FIG. 3 is an X-ray diffraction spectrum of a solid electrolyte obtained in Example 2.

FIG. 4 is an X-ray diffraction spectrum of a solid electrolyte obtained in Example 4.

FIG. 5 is an X-ray diffraction spectrum of a solid electrolyte obtained in Example 5.

FIG. 6 is an X-ray diffraction spectrum of a solid electrolyte obtained in Comparative Example 5.

FIG. 7 is an infrared absorption spectrum measured by FT-IR analysis (diffuse reflection method) of complexes obtained in Production Examples 2 and 3.

DESCRIPTION OF PREFERRED EMBODIMENTS

Embodiments of the present invention (hereinafter the embodiment will be sometimes referred to as "present embodiment") are hereunder described. In this specification, numerical values of an upper limit and a lower limit according to numerical value ranges of "or more", "or less", and "XX to YY" are each a numerical value which can be arbitrarily combined, and numerical values of the section of Examples can also be used as numerical values of an upper limit and a lower limit, respectively. In addition, a provision that is considered preferable can be arbitrarily adopted. That is, one preferable provision may be employed in combination with one or more other preferable provisions. It can be said that a combination of preferable ones is more preferable.

The method of producing a solid electrolyte of the present embodiment is one including a first step of mixing two or more compounds satisfying the following (1) and a complexing agent 1 satisfying the following (2), and a second step of further mixing in a complexing agent 2 satisfying the following (3) after the first step, wherein said two or more compounds satisfying (1), taken together comprise all of a lithium element, a sulfur element, a phosphorus element and a halogen element.

(1) A compound containing one or more selected from a group consisting of a lithium element, a sulfur element, a phosphorus element and a halogen element.

(2) A complexing agent capable of forming a complex containing $Li_3PS_4$ and a halogen element.

(3) A complexing agent other than the complexing agent 1, capable of forming a complex containing $Li_3PS_4$.

[Solid Electrolyte]

The "solid electrolyte" as referred to in this specification means an electrolyte of keeping the solid state at 25° C. in a nitrogen atmosphere. The solid electrolyte in the present embodiment is a solid electrolyte containing a lithium element, a sulfur element, a phosphorus element, and a halogen element and having an ionic conductivity to be caused owing to the lithium element.

In the "solid electrolyte", both of a crystalline solid electrolyte having a crystal structure obtained by the production method of the present embodiment and an amorphous solid electrolyte are included.

The crystalline solid electrolyte as referred to in this specification is a material that is a solid electrolyte in which peaks derived from the solid electrolyte are observed in an X-ray diffraction pattern in the X-ray diffractometry, and the presence or absence of peaks derived from the raw materials of the solid electrolyte does not matter. That is, the crystalline solid electrolyte contains a crystal structure derived from the solid electrolyte, in which a part thereof may be a crystal structure derived from the solid electrolyte, or all of them may be a crystal structure derived from the solid electrolyte. The crystalline solid electrolyte may partially contain an amorphous solid electrolyte in a part thereof so long as it has the X-ray diffraction pattern as mentioned above. In consequence, in the crystalline solid electrolyte, a so-called glass ceramics which is obtained by heating the amorphous solid electrolyte to a crystallization temperature or higher is contained.

The amorphous solid electrolyte as referred to in this specification is a halo pattern in which other peak than the peaks derived from the materials is not substantially observed in an X-ray diffraction pattern in the X-ray diffractometry, and the presence or absence of peaks derived from the raw materials of the solid electrolyte does not matter.

[Compound Satisfying (1)]

The compound satisfying (1) used in the present embodiment (hereinafter also simply referred to as "raw material") is a compound containing one or more selected from the group consisting of a lithium element, a sulfur element, a phosphorus element and a halogen element, and two or more of the compounds are used.

More specifically, representative examples of the foregoing compound include raw materials composed of at least two elements selected from the aforementioned four elements, such as lithium sulfide; lithium halides, e.g., lithium fluoride, lithium chloride, lithium bromide, and lithium iodide; phosphorus sulfides, e.g., diphosphorus trisulfide ($P_2S_3$) and diphosphorus pentasulfide ($P_2S_5$); phosphorus halides, e.g., various phosphorus fluorides (e.g., $PF_3$ and $PF_5$), various phosphorus chlorides (e.g., $PCl_3$, $PCl_5$, and $P_2Cl_4$), various phosphorus bromides (e.g., $PBr_3$ and $PBr_5$), and various phosphorus iodides (e.g., $PI_3$ and $P_2I_4$); and thiophosphoryl halides, e.g., thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$), as well as halogen simple substances, such as fluorine ($F_2$), chlorine ($Cl_2$), bromine ($Br_2$), and iodine ($I_2$), with bromine ($Br_2$) and iodine ($I_2$) being preferred.

As materials which may be used as the raw material other than those mentioned above, a compound containing not only at least one element selected from the aforementioned four elements but also other element than the foregoing four elements can be used. More specifically, examples thereof include lithium compounds, such as lithium oxide, lithium hydroxide, and lithium carbonate; alkali metal sulfides, such as sodium sulfide, potassium sulfide, rubidium sulfide, and cesium sulfide; metal sulfides, such as silicon sulfide, germanium sulfide, boron sulfide, gallium sulfide, tin sulfide (e.g., SnS and $SnS_2$), aluminum sulfide, and zinc sulfide; phosphoric acid compounds, such as sodium phosphate and lithium phosphate; halide compounds of an alkali metal other than lithium, such as sodium halides, e.g., sodium iodide, sodium fluoride, sodium chloride, and sodium bromide; metal halides, such as an aluminum halide, a silicon halide, a germanium halide, an arsenic halide, a selenium halide, a tin halide, an antimony halide, a tellurium halide, and a bismuth halide; and phosphorus oxyhalides, such as phosphorus oxychloride ($POCl_3$) and phosphorus oxybromide ($POBr_3$).

Among them, phosphorus sulfides, such as lithium sulfide, diphosphorus trifluoride ($P_2S_3$), and diphosphorus pentasulfide ($P_2S_5$); halogen simple substances, such as fluorine ($F_2$), chlorine ($Cl_2$), bromine ($Br_2$), and iodine ($I_2$); and lithium halides, such as lithium fluoride, lithium chloride, lithium bromide, and lithium iodide are preferred. Further, when an oxygen element is introduced into the solid electrolyte, phosphoric acid compounds such as lithium oxide, lithium hydroxide and lithium phosphate are preferred. Preferred examples of a combination of raw materials include a combination of lithium sulfide, diphosphorus pentasulfide, and a lithium halide; and a combination of lithium sulfide, diphosphorus pentasulfide, and a halogen simple substance, in which the lithium halide is preferably lithium bromide or lithium iodide, and the halogen simple substance is preferably bromine or iodine.

In the present embodiment, $Li_3PS_4$ containing a $PS_4$ structure can also be used as part of the raw material. Specifically, $Li_3PS_4$ is first prepared by producing the same, and $Li_3PS_4$ is used as a raw material.

The content of $Li_3PS_4$ with respect to the total amount of raw materials is preferably 60 to 100 mol %, more preferably 65 to 90 mol %, and even more preferably 70 to 80 mol %.

Further, when $Li_3PS_4$ and a halogen simple substance are used, the content of the halogen simple substance with respect to $Li_3PS_4$ is preferably 1 to 50 mol %, more preferably 10 to 40 mol %, still more preferably 20 to 30 mol %, and even more preferably 22 to 28 mol %.

The lithium sulfide which is used in the present embodiment is preferably a particle.

An average particle diameter ($D_{50}$) of the lithium sulfide particle is preferably 0.1 μm or more and 1,000 μm or less, more preferably 0.5 μm or more and 100 μm or less, and still more preferably 1 μm or more and 20 μm or less. In the present specification, the average particle diameter ($D_{50}$) is the particle diameter at which 50% of the total particle diameter is reached by accumulating sequentially from the particle having the smallest particle diameter when drawing a particle diameter distribution accumulation curve, and the volume distribution refers to the average particle size, which can be measured using, for example, a laser diffraction/scattering particle size distribution analyzer. Among the above-exemplified raw materials, the solid raw material is preferably one having an average particle diameter of the same degree as in the aforementioned lithium sulfide particle, namely one having an average particle diameter falling within the same range as in the aforementioned lithium sulfide particle is preferred.

In the case of using lithium sulfide, diphosphorus pentasulfide, and the lithium halide as the raw materials, from the viewpoint of obtaining higher chemical stability and a higher ionic conductivity, a proportion of lithium sulfide relative to the total of lithium sulfide and diphosphorus pentasulfide is preferably 70 to 80 mol %, more preferably 72 to 78 mol %, and still more preferably 74 to 78 mol %.

In the case of using lithium sulfide, diphosphorus pentasulfide, a lithium halide, and other raw material to be optionally used, the content of lithium sulfide and diphosphorus pentasulfide relative to the total of the aforementioned raw materials is preferably 60 to 100 mol %, more preferably 65 to 90 mol %, and still more preferably 70 to 80 mol %.

In the case of using a combination of lithium bromide and lithium iodide as the lithium halide, from the viewpoint of enhancing the ionic conductivity, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the case of using not only a halogen simple substance but also lithium sulfide and diphosphorus pentasulfide as the raw materials, a proportion of the molar number of lithium sulfide excluding lithium sulfide having the same molar number as the molar number of the halogen simple substance relative to the total molar number of lithium sulfide and diphosphorus pentasulfide excluding lithium sulfide having the same molar number as the molar number of the halogen simple substance falls preferably within a range of 60 to 90%, more preferably within a range of 65 to 85%, still more preferably within a range of 68 to 82%, yet still more preferably within a range of 72 to 78%, and especially preferably within a range of 73 to 77%. This is because when the foregoing proportion falls within the aforementioned ranges, a higher ionic conductivity is obtained.

In addition, in the case of using lithium sulfide, diphosphorus pentasulfide, and a halogen simple substance, from the same viewpoint, the content of the halogen simple substance relative to the total amount of lithium sulfide, diphosphorus pentasulfide, and the halogen simple substance is preferably 1 to 50 mol %, more preferably 2 to 40 mol %, still more preferably 3 to 25 mol %, and yet still more preferably 3 to 15 mol %.

In the case of using lithium sulfide, diphosphorus pentasulfide, a halogen simple substance, and a lithium halide, the content ($\alpha$ mol %) of the halogen simple substance and the content ($\beta$ mol %) of the lithium halide relative to the total of the aforementioned raw materials preferably satisfy the following expression (2), more preferably satisfy the following expression (3), still more preferably satisfy the following expression (4), and yet still more preferably satisfy the following expression (5).

$$2 \leq (2\alpha + \beta) \leq 100 \tag{2}$$

$$4 \leq (2\alpha + \beta) \leq 80 \tag{3}$$

$$6 \leq (2\alpha + \beta) \leq 50 \tag{4}$$

$$6 \leq (2\alpha + \beta) \leq 30 \tag{5}$$

In the case of using two kinds of halogen as simple substances, when the molar number in the substance of the halogen element of one side is designated as A1, and the molar number in the substance of the halogen element of the other side is designated as A2, an A1/A2 ratio is preferably (1 to 99)/(99 to 1), more preferably 10/90 to 90/10, still more preferably 20/80 to 80/20, and yet still more preferably 30/70 to 70/30.

In the case where the two halogen simple substances are bromine and iodine, when the molar number of bromine is designated as B1, and the molar number of iodine is designated as B2, a B1/B2 ratio is preferably (1 to 99)/(99 to 1), more preferably 15/85 to 90/10, still more preferably 20/80 to 80/20, yet still more preferably 30/70 to 75/25, and especially preferably 35/65 to 75/25.

[Complexing Agent 1 Satisfying (2)]

The complexing agent 1 as referred to in this specification is a complexing agent satisfying the above (2), that is, a complexing agent being capable of forming a complex containing a halogen element and $Li_3PS_4$ obtained from $Li_2S$, $P_2S_5$, etc., which are preferably used as raw materials of the solid electrolyte, preferably having the ability to form $Li_3PS_4$, and being capable of forming a complex containing the formed $Li_3PS_4$ and a halogen element, and the complexing agent 1 is used in the first step.

As the complexing agent 1, any material can be used without being particularly restricted so long as it has the aforementioned properties. In particular, elements having a high affinity with the lithium element, for example, compounds containing a hetero element, such as a nitrogen element, an oxygen element, and a chlorine element, are preferably exemplified, and compounds having a group containing such a hetero element are more preferably exemplified. This is because such a hetero element and the group containing the foregoing hetero element may be coordinated (bound) with lithium.

It may be considered that with respect to the complexing agent 1, the hetero element present in the molecule thereof has a high affinity with the lithium element, and the complexing agent 1 has such properties of binding with $Li_3PS_4$ containing a $PS_4$ structure which is a main skeleton of the solid electrolyte produced according to the present embodiment, and raw materials containing a lithium element and a halogen element such as lithium halides, thereby easily forming a complex. For that reason, since by mixing the aforementioned raw material and the complexing agent 1, the complex is formed, and it is possible to deposit various components while maintaining their dispersed state in the deposition step, whereby an electrolyte precursor in which the halogen element is more likely dispersed and fixed is obtained, as a result, it may be considered that a solid electrolyte having a high ionic conductivity is obtained.

That the complexing agent 1 is capable of forming a complex containing $Li_3PS_4$ and a halogen element can be directly verified by the infrared absorption spectrum measured by FT-IR analysis (diffuse reflection method) in Examples to be described later.

In the Examples, the complexing agent 1 itself, and a powder obtained by stirring the complexing agent 1 (tetramethylethylenediamine, hereinafter simply referred to as "TMEDA") and lithium iodide (LiI) were analyzed by FT-IR analysis (diffuse reflection method). As shown in FIG. 7, it can be seen that the powder obtained by stirring the complexing agent 1 and lithium iodide differs from the spectrum of TMEDA itself, especially in the peaks derived from C—N stretching vibrations at 1000 to 1250 cm$^{-1}$. Further, it is known that an LiI-TMEDA complex is formed by stirring and mixing MEDA and lithium iodide (for example, Aust, J. Chem., 1988, 41, 1925-34, especially FIG. 2, etc.), so it is be considered that an LiI-TMEDA complex has been formed.

On the other hand, the powder obtained by stirring the complexing agent 1 (tetramethylethylenediamine, TMEDA) and $Li_3PS_4$ was also analyzed by FT-IR analysis (diffuse reflection method) in the same manner as described above. As shown in FIG. 7, it can be seen that it differs from the spectrum of TMEDA itself in the peaks derived from C—N stretching vibrations at 1000 to 1250 cm$^{-1}$, while it is similar to the spectrum of the LiI-TMEDA complex. From this, it is considered that a $Li_3PS_4$-TMEDA complex has been formed.

Thus, the above (2) satisfied by the complexing agent 1, that is, the property capable of forming a complex containing $Li_3PS_4$ and a halogen element can be specifically verified.

In consequence, the complexing agent 1 preferably has at least two hetero elements capable of being coordinated (bound) therewith in the molecule, and more preferably has at least two hetero element-containing groups in the molecule. In view of the fact that the complexing agent 1 has at least two hetero element-containing groups in the molecule, $Li_3PS_4$, and raw materials containing lithium and halogens such as lithium halides, can be bound with each other via the at least two hetero elements in the molecule. In addition, among the hetero elements, a nitrogen element is preferred, and an amino group is preferred as the group containing a nitrogen element. In other words, the complexing agent is preferably an amine compound.

The amine compound is not particularly restricted so long as it has an amino group in the molecule because it may promote formation of a complex. However, a compound having at least two amino groups in the molecule is preferred. In view of the fact that the complexing agent has such a structure, $Li_3PS_4$, and raw materials containing lithium and halogens such as lithium halides, can be bound with each other via at least two nitrogen elements in the molecule.

Examples of such an amine compound include amine compounds, such as aliphatic amines, alicyclic amines, heterocyclic amines, and aromatic amines, and these amine compounds can be used alone or in combination of plural kinds thereof.

More specifically, as the aliphatic amine, aliphatic primary diamines, such as ethylenediamine, diaminopropane, and diaminobutane; aliphatic secondary diamines, such as N,N'-dimethylethylenediamine, N,N'-diethylethylenediamine, N,N'-dimethyldiaminopropane, and N,N'-diethyldiaminopropane; and aliphatic tertiary diamines, such as N,N,N',N'-tetramethyldiaminomethane, N,N,N',N'-tetramethylethylenediamine, N,N,N',N'-tetraethylethylenediamine, N,N,N',N'-tetramethyldiaminopropane, N,N,N',N'-tetraethyldiaminopropane, N,N,N',N'-tetramethyldiaminobutane, N,N,N',N'-tetramethyldiaminopentane, and N,N,N',N'-tetramethyldiaminohexane, are representatively preferably exemplified. Here, in the exemplification in this specification, for example, when the diaminobutane is concerned, it should be construed that all of isomers inclusive of not only isomers regarding the position of the amino group, such as 1,2-diaminobutane, 1,3-diaminobutane, and 1,4-diaminobutane, but also linear or branched isomers and so on regarding the butane are included unless otherwise noted.

The carbon number of the aliphatic amine is preferably 2 or more, more preferably 4 or more, and still more preferably 6 or more, and an upper limit thereof is preferably 10 or less, more preferably 8 or less, and still more preferably 7 or less. In addition, the carbon number of the aliphatic hydrocarbon group in the aliphatic amine is preferably 2 or more, and an upper limit thereof is preferably 6 or less, more preferably 4 or less, and still more preferably 3 or less.

As the alicyclic amine, alicyclic primary diamines, such as cyclopropanediamine and cyclohexanediamine; alicyclic secondary diamines, such as bisaminomethylcyclohexane; and alicyclic tertiary diamines, such as N,N,N',N'-tetramethyl-cyclohexanediamine and bis(ethylmethylamino)cyclohexane, are representatively preferably exemplified. As the heterocyclic diamine, heterocyclic primary diamines, such as isophoronediamine; heterocyclic secondary diamines, such as piperazine and dipiperidylpropane; and heterocyclic tertiary diamines, such as N,N-dimethylpiperazine and bis-methylpiperidylpropane, are representatively preferably exemplified.

The carbon number of each of the alicyclic amine and the heterocyclic amine is preferably 3 or more, and more preferably 4 or more, and an upper limit thereof is preferably 16 or less, and more preferably 14 or less.

As the aromatic amine, aromatic primary diamines, phenyldiamine, tolylenediamine, and naphthalenediamine; aromatic secondary diamines, such as N-methylphenylenediamine, N,N'-dimethylphenylenediamine, N,N'-bismethylphenylphenylenediamine, N,N'-dimethylnaphthalenediamine, and N-naphthylethylenediamine; and aromatic tertiary diamines, such as N,N-dimethylphenylenediamine, N,N,N',N'-tetramethylphenylenediamine, N,N,N',N'-tetramethyldiaminodiphenylmethane, and N,N,N',N'-tetramethylnaphthalenediamine, are representatively preferably exemplified.

The carbon number of the aromatic amine is preferably 6 or more, more preferably 7 or more, and still more preferably 8 or more, and an upper limit thereof is preferably 16 or less, more preferably 14 or less, and still more preferably 12 or less.

The amine compound which is used in the present embodiment may also be one substituted with a substituent, such as an alkyl group, an alkenyl group, an alkoxy group, a hydroxy group, and a cyano group, or a halogen atom.

While the diamines have been exemplified as specific examples, needless to say, the amine compound which may be used in the present embodiment is not limited to diamines. Examples thereof include trimethylamine, triethylamine, ethyldimethylamine, aliphatic monoamines corresponding to various diamines, such as the aforementioned aliphatic diamines, piperidine compounds, such as piperidine, methylpiperidine, and tetramethylpiperidine, pyridine compounds, such as pyridine and picoline, morpholine compound, such as morpholine, methylmorpholine, and thiomorpholine, imidazole compounds, such as imidazole and methylimidazole, alicyclic monoamines, such as monoamines corresponding to the aforementioned alicyclic diamines, and monoamines, such as aromatic monoamines corresponding to the aforementioned aromatic diamines. Besides, for example, polyamines having three or more amino groups, such as diethylenetriamine, N,N',N"-trimethyldiethylenetriamine, N,N,N',N",N"-pentamethyldiethylenetriamine, triethylenetetramine, N,N'-bis[(dimethylamino)ethyl]-N,N'-dimethylethylenediamine, hexamethylenetetramine, and tetraethylenepentamine, can also be used.

Among those described above, from the viewpoint of obtaining a high ionic conductivity, a tertiary amines having a tertiary amino group as the amino group are preferred, tertiary diamines having two tertiary amino groups are more preferred, tertiary diamines having two tertiary amino groups on the both ends are still more preferred, and aliphatic tertiary diamines having a tertiary amino group on the both ends are yet still more preferred. In the aforementioned amine compounds, as the aliphatic tertiary diamine having a tertiary amino group on the both ends, tetramethylethylenediamine, tetraethylethylenediamine, tetramethyldiaminopropane, and tetraethyldiaminopropane are preferred, and taking into account easiness of availability and so on, tetramethylethylenediamine and tetramethyldiaminopropane are preferred.

In addition, a compound having a group containing, as the hetero element, a nitrogen element other than the amino group, for example, a nitro group and an amide group, provides the same effects.

Regarding the adding amount of the complexing agent 1, from the viewpoint of efficiently forming a complex, with respect to a total molar amount of Li atoms contained in the two or more compounds satisfying the above (1), the molar ratio of the amount of the complexing agent 1 added is preferably 0.1 or more and 2.0 or less, more preferably 0.5 or more and 1.5 or less, still more preferably 0.8 or more and 1.2 or less, and most preferably 1.0.

[Complexing Agent 2 Satisfying (3)]

The complexing agent 2 referred to in the present specification is a complex other than the complexing agent 1, which satisfies the above (3), that is, is capable of forming a complex containing $Li_3PS_4$ obtained from $Li_2S$ and $P_2S_5$ that are preferably used as raw materials of a solid electrolyte, and it is used in the first step. In particular, it refers to complexing agent that forms $Li_3PS_4$ at a higher rate than the complexing agent 1.

By further mixing in the complexing agent 2 after the complexing agent 1 is mixed, it becomes possible to proceed without stagnation of the formation reaction of $Li_3PS_4$, which would stagnate with the complexing agent 1 alone.

Although the reason why such a thing is possible is not clear, the following hypothesis is conceivable.

That is, although complexing agent 1 has an excellent balance between the ability to form $Li_3PS_4$ and the ability to form a complex containing $Li_3PS_4$ and a halogen element, the ability to form $Li_3PS_4$ is inferior to that of the complexing agent 2. Therefore, as the reaction for forming $Li_3PS_4$ progresses and the concentration of $Li_2S$ and the like present in the system decreases, the speed of the reaction for forming $Li_3PS_4$ slows down and gradually stagnates. However, by further mixing in the complexing agent 2 that has an excellent ability to form $Li_3PS_4$ compared to the complexing agent 1 after mixing the complexing agent 1, it becomes possible to accelerate the $Li_3PS_4$ formation reaction again even if the concentration of $Li_2S$ and the like present in the reaction field is low. At this time, because of the presence of the complexing agent 1, which is superior in the ability to form a complex containing $Li_3PS_4$ and a halogen element compared to the complexing agent 2, the characteristics of both the complexing agent 1 and the complexing agent 2 are utilized, the formation reaction of $Li_3PS_4$ progresses, and a complex containing the formed $Li_3PS_4$ and a halogen element is formed without stagnation.

Regarding the property of the complexing agent 2, that is, the above (3) being capable of forming a complex containing $Li_3PS_4$, it is known that, for example, dimethoxyethane (DME), which will be described later as the complexing agent 2, forms a complex containing $Li_3PS_4$ (see, for example, Chem. Mater. 2017, 29, 1830-1835, and FIG. S4 of Supporting Information thereof), and it is known that, for example, tetrahydrofuran (THF) forms a complex containing $Li_3PS_4$ (see, for example, J. Am. Chem. Soc. 2013, 135, 975-978, especially "Decomposition of $Li_3PS_4$-3THF forms B—$Li_3PS_4$" on page 976 and FIG. S1 of Supporting Information thereof).

Therefore, the above (3) satisfied by the complexing agent 2, that is, the property capable of forming a complex containing $Li_3PS_4$ is a property that can be specifically verified.

As the complexing agent 2, any material can be used without being particularly restricted so long as it has the aforementioned properties. In particular, elements having a high affinity with the lithium element, for example, compounds containing a hetero element, such as a nitrogen element, an oxygen element, and a chlorine element, are preferably exemplified, and compounds having a group containing such a hetero element are more preferably exemplified. This is because such a hetero element and the group containing the foregoing hetero element may be coordinated (bound) with lithium.

It may be considered that with respect to the complexing agent 2, the hetero element present in the molecule thereof has a high affinity with the lithium element, and the complexing agent 2 has such properties of binding with $Li_3PS_4$ containing a $PS_4$ structure which is a main skeleton of the solid electrolyte produced according to the present embodiment, thereby easily forming a complex. For that reason, it may be considered that the formation of the $Li_3PS_4$-containing complex is accelerated by mixing the aforementioned raw material and the complexing agent 2.

Among the hetero elements, an oxygen element is preferable. A group containing the oxygen element preferably has one or more functional groups selected from an ether group and an ester group, and particularly preferably has an ether group. That is, an ether compound is particularly preferred as a complexing agent. In relation to the complexing agent 1, the complexing agent 2 preferably does not contain a nitrogen element as a hetero element. Therefore, in the present embodiment, it is preferable that the complexing agent 1 contains a nitrogen element as a hetero element, and that the complexing agent 2 does not contain a nitrogen element but contains an oxygen element as a hetero element. In this way, the functions of the complexing agent 1 and the complexing agent 2 can be effectively utilized, and the ionic conductivity of the obtained solid electrolyte can be improved.

Examples of such an ether compound include ether compounds such as aliphatic ethers, alicyclic ethers, heterocyclic ethers, and aromatic ethers, which may be used singly or in combination.

More specifically, examples of aliphatic ethers include monoethers such as dimethyl ether, diethyl ether, diisopropyl ether, dibutyl ether, and tert-butyl methyl ether; diethers such as dimethoxymethane, dimethoxyethane, diethoxymethane, and diethoxyethane; polyethers having three or more ether groups such as diethylene glycol dimethyl ether (diglyme) and triethylene oxide glycol dimethyl ether (triglyme); and ethers containing a hydroxy group such as diethylene glycol and triethylene glycol.

The number of carbon atoms in the aliphatic ether is preferably 2 or more, more preferably 3 or more, still more preferably 4 or more, and the upper limit is preferably 10 or less, more preferably 8 or less, and still more preferably 6 or less.

Further, the number of carbon atoms in the aliphatic hydrocarbon group in the aliphatic ether is preferably 1 or more, and the upper limit is preferably 6 or less, more preferably 4 or less, and even more preferably 3 or less.

Examples of alicyclic ethers include ethylene oxide, propylene oxide, tetrahydrofuran, tetrahydropyran, dimethoxytetrahydrofuran, cyclopentyl methyl ether, dioxane, and dioxolane. In addition, examples of heterocyclic ethers include furan, benzofuran, benzopyran, dioxene, dioxin, morpholine, methoxyindole, and hydroxymethyldimethoxypyridine.

The number of carbon atoms in the alicyclic ether and heterocyclic ether is preferably 3 or more, more preferably 4 or more, and the upper limit is preferably 16 or less, more preferably 14 or less.

Examples of aromatic ethers include methylphenyl ether (anisole), ethylphenyl ether, dibenzyl ether, diphenyl ether, benzylphenyl ether, and naphthyl ether.

The number of carbon atoms in the aromatic ether is preferably 7 or more, more preferably 8 or more, and the upper limit is preferably 16 or less, more preferably 14 or less, and still more preferably 12 or less.

The ether compound used in the present embodiment may be a compound substituted with a substituent such as an alkyl group, an alkenyl group, an alkoxyl group, a hydroxy group, and a cyano group, or a halogen atom.

From the viewpoint of obtaining higher ionic conductivity, the ether compound used in the present embodiment is preferably an aliphatic ether, more preferably dimethoxyethane or tetrahydrofuran.

Further, examples of ester compounds include ester compounds such as aliphatic esters, alicyclic esters, heterocyclic esters, and aromatic esters, and they can be used alone or in combination.

More specifically, examples of aliphatic esters include formic acid esters such as methyl formate, ethyl formate, and triethyl formate, acetate esters such as methyl acetate, ethyl acetate, propyl acetate, isopropyl acetate, butyl acetate, and isobutyl acetate; propionate esters such as methyl propionate, ethyl propionate, propyl propionate and butyl propionate, oxalic acid esters such as dimethyl oxalate and diethyl oxalate; malonic esters such as dimethyl malonate and diethyl malonate; and succinate esters such as dimethyl succinate and diethyl succinate.

The number of carbon atoms in the aliphatic ester is preferably 2 or more, more preferably 3 or more, still more preferably 4 or more, and the upper limit is preferably 10 or less, more preferably 8 or less, and still more preferably 7 or less. In addition, the number of carbon atoms in the aliphatic hydrocarbon group in the aliphatic ester is preferably 1 or more, more preferably 2 or more, and the upper limit is preferably 6 or less, more preferably 4 or less, and still more preferably 3 or less.

Examples of alicyclic esters include methyl cyclohexanecarboxylate, ethyl cyclohexanecarboxylate, dimethyl cyclohexanedicarboxylate, dibutyl cyclohexanedicarboxylate, and dibutyl cyclohexenedicarboxylate. Examples of heterocyclic esters include methyl pyridinecarboxylate, ethyl pyridinecarboxylate, propyl pyridinecarboxylate, methyl pyrimidinecarboxylate, ethyl pyrimidinecarboxylate, and lactones such as acetolactone, propiolactone, butyrolactone and valerolactone.

The number of carbon atoms in the alicyclic ester or heterocyclic ester is preferably 3 or more, more preferably 4 or more, and the upper limit is preferably 16 or less, more preferably 14 or less.

Examples of aromatic esters include benzoic acid esters such as methyl benzoate, ethyl benzoate, propyl benzoate, and butyl benzoate; phthalates such as dimethyl phthalate, diethyl phthalate, dibutyl phthalate, butylbenzyl phthalate, and dicyclohexyl phthalate; and trimellitate esters such as trimethyl trimellitate, triethyl trimellitate, tripropyl trimellitate, tributyl trimellitate, and trioctyl trimellitate.

The number of carbon atoms in the aromatic ester is preferably 8 or more, more preferably 9 or more, and the upper limit is preferably 16 or less, more preferably 14 or less, and still more preferably 12 or less.

The ester compound used in the present embodiment may be a compound substituted with a substituent such as an alkyl group, an alkenyl group, an alkoxyl group, a hydroxy group, and a cyano group, or a halogen element.

From the viewpoint of obtaining higher ionic conductivity, the ester compound used in the present embodiment is preferably an aliphatic ester, more preferably an acetate ester, and particularly preferably ethyl acetate.

Moreover, in the present embodiment, it is preferable to mix in the complexing agent 2 after the complex formation reaction by the complexing agent 1 has progressed to a certain extent.

The method of measuring an appropriate timing for adding the complexing agent 2 is not particularly limited. However, for example, when lithium sulfide has been used as one of the raw materials, a higher effect can be exhibited by adding the complexing agent 2 at the timing when the residual amount of lithium sulfide present in the system has decreased to a certain value.

Specifically, the complex formation reaction can be further accelerated by adding in the complexing agent 2 after the residual amount of lithium sulfide decreases to, with respect to the input amount, preferably 35 mol % or less, more preferably 30 mol % or less, still more preferably 25 mol % or less. The amount of lithium sulfide remaining in the system can be measured by a method described in Examples.

Regarding the adding amount of the complexing agent 2, from the viewpoint of efficiently forming a complex, with respect to a total molar amount of $Li_3PS_4$ that can be generated from two or more compounds satisfying the above (1), the molar ratio of the amount of the complexing agent 2 added is preferably 1.0 or more and 5.0 or less, more preferably 2.0 or more and 4.0 or less, and still more preferably 2.5 or more and 3.5 or less.

[Solvent]

In the present embodiment, a solvent can be further added when mixing the raw materials and the complexing agent.

When a solid complex is formed in a liquid complexing agent, separation of the components may occur if the complex is readily soluble in the complexing agent. Therefore, by using a solvent in which the complex does not dissolve, elution of the components in the electrolyte precursor can be suppressed. In addition, by mixing the raw materials and the complexing agent using a solvent, the complex formation is promoted, each main component can be more evenly present, whereby an electrolyte precursor in which the halogen element is more dispersed and fixed is be obtained, as a result, the effect of obtaining a high ionic conductivity is easily exhibited.

The method of producing a solid electrolyte of the present embodiment is a so-called heterogeneous method, and it is preferred that the complex is not completely dissolved in the complexing agent that is a liquid but deposited. By adding the solvent, the solubility of the complex can be adjusted. In particular, the halogen element is liable to be eluted from the complex, and therefore, by adding the solvent, the elution of the halogen element is suppressed, whereby the desired complex is obtained. As a result, a crystalline solid electrolyte having a high ionic conductivity can be obtained via the electrolyte precursor in which the components, such as a halogen, are dispersed.

As the solvent having such properties, a solvent having a solubility parameter of 10 or less is preferably exemplified. In this specification, the solubility parameter is described in various literatures, for example, "Handbook of Chemistry" (published in 2004, Revised 5th Edition, by Maruzen Publishing Co., Ltd.) and is a value δ ((cal/cm³)^{1/2}) calculated according to the following numerical formula (1), which is also called a Hildebrand parameter, SP value.

$$\delta = \sqrt{(\Delta H - RT)/V} \tag{1}$$

In the numerical formula (1), ΔH is a molar heating value; R is a gas constant; T is a temperature; and V is molar volume.

By using the solvent having a solubility parameter of 10 or less, the solvent can be in a state in which, as compared by the aforementioned complexing agent, it relatively hardly dissolves the halogen element, the raw materials containing a halogen element, such as a lithium halide, and further the halogen element-containing component constituting the co-crystal contained in the complex (for example, an aggregate in which lithium halide and the complexing agent are bound with each other); it is easy to fix the halogen element within the complex; the halogen element is existent in a favorable state in the resulting electrolyte precursor and further the solid electrolyte; and a solid electrolyte having a high ionic conductivity is readily obtained. That is, it is preferred that the solvent which is used in the present embodiment has such properties that it does not dissolve the complex. From the same viewpoint, the solubility parameter of the solvent is preferably 9.5 or less, more preferably 9.0 or less, and still more preferably 8.5 or less.

More specifically, as the solvent which is used in the present embodiment, it is possible to broadly adopt a solvent which has hitherto been used in the production of a solid electrolyte. Examples thereof include hydrocarbon solvents, such as an aliphatic hydrocarbon solvent, an alicyclic hydrocarbon solvent, and an aromatic hydrocarbon solvent; and carbon atom-containing solvents, such as an alcohol-based solvent, an ester-based solvent, an aldehyde-based solvent, a ketone-based solvent, an ether-based solvent having 4 or more carbon atoms on one side, and a solvent containing a carbon atom and a hetero atom. Of these, preferably, a solvent having a solubility parameter falling within the aforementioned range may be appropriately selected and used.

More specifically, examples of the solvent include an aliphatic hydrocarbon solvent, such as hexane (7.3), pentane (7.0), 2-ethylhexane, heptane (7.4), octane (7.5), decane, undecane, dodecane, and tridecane; an alicyclic hydrocarbon solvent, such as cyclohexane (8.2) and methylcyclohexane; an aromatic hydrocarbon solvent, such as benzene, toluene (8.8), xylene (8.8), mesitylene, ethylbenzene (8.8), tert-butylbenzene, trifluoromethylbenzene, nitrobenzene, chlorobenzene (9.5), chlorotoluene (8.8), and bromobenzene; an alcohol-based solvent, such as ethanol (12.7) and butanol (11.4); an aldehyde-based solvent, such as formaldehyde, acetaldehyde (10.3), and dimethylformamide (12.1); a ketone-based solvent, such as acetone (9.9) and methyl ethyl ketone; an ether-based solvent, such as dibutyl ether, cyclopentylmethyl ether (8.4), tert-butylmethyl ether, and anisole; and a solvent containing a carbon atom and a hetero atom, such as acetonitrile (11.9), dimethyl sulfoxide, and carbon disulfide. The numerical values within the parentheses in the aforementioned exemplifications are an SP value.

Of these solvents, an aliphatic hydrocarbon solvent, an alicyclic hydrocarbon solvent, an aromatic hydrocarbon solvent, and an ether-based solvent are preferred; from the viewpoint of obtaining a higher ionic conductivity more stably, heptane, cyclohexane, toluene, ethylbenzene, diethyl ether, diisopropyl ether, dibutyl ether, dimethoxyethane, cyclopentylmethyl ether, tert-butylmethyl ether, and anisole are more preferred; diethyl ether, diisopropyl ether, and dibutyl ether are still more preferred; diisopropyl ether and dibutyl ether are yet still more preferred; and cyclohexane is especially preferred. The solvent which is used in the present embodiment is preferably the organic solvent as exemplified above and is an organic solvent different from the aforementioned complexing agent. In the present embodiment, these solvents may be used alone or in combination of a plural kind thereof.

[Mixing]

The present embodiment includes a first step of mixing the raw materials and the complexing agent 1, and a second step of further mixing in the complexing agent 2 after the first step. In the present embodiment, though a mode of mixing the raw materials and the complexing agent may be in any of a solid state and a liquid state, in general, the raw materials contain a solid, whereas the complexing agent is in a liquid state, and therefore, in general, mixing is made in a mode in which the solid raw material is existent in the liquid complexing agent. Moreover, when mixing the raw materials and the complexing agent, a solvent may be further mixed as necessary. Hereinafter, in the description of the mixing of the raw materials and the complexing agent, the complexing agent includes the solvent added as necessary, unless otherwise specified.

A method for mixing the raw materials and the complexing agent is not particularly restricted, and the raw materials and the complexing agent may be charged in an apparatus capable of mixing the raw materials and the complexing agent and mixed. For example, by feeding the complexing agent into a tank, actuating an impeller, and then gradually adding the raw materials, a favorable mixing state of the raw materials is obtained, and dispersibility of the raw materials is enhanced, and thus, such is preferred.

However, in the case of using a halogen simple substance as the raw material, there is a case where the raw material is not a solid. Specifically, fluorine and chlorine are a gas, and bromine is a liquid under normal temperature and normal pressure. In such a case, for example, in the case where the raw material is a liquid, it may be fed into the tank separately from the other raw materials together with the complexing agent, and in the case where the raw material is a gas, the raw material may be fed such that it is blown into the complexing agent having the solid raw materials added thereto.

The method of producing a solid electrolyte of the present embodiment is characterized by including mixing the raw materials and the complexing agent, and the electrolyte precursor can also be produced by a method not using an instrument to be used for the purpose of pulverization of solid raw materials, which is generally called a pulverizer, such as a medium type pulverizer, e.g., a ball mill and a bead mill. According to the method of producing a solid electrolyte of the present embodiment, by merely mixing the raw materials and the complexing agent, the raw materials and the complexing agent contained in the inclusion are mixed, whereby the complex can be formed. In order to shorten the mixing time for obtaining the complex or to perform atomization, the mixture of the raw materials and the complexing agent may be pulverized by a pulverizer. However, from the viewpoint of improving productivity, it is preferable not to use a pulverizer in the first step, that is, it is preferable not to perform pulverization mixing in the first step.

Examples of an apparatus for mixing the raw materials and the complexing agent include a mechanical agitation type mixer having an impeller provided in a tank. Examples of the mechanical agitation type mixer include a high-speed agitation type mixer and a double arm type mixer, and a high-speed agitation type mixer is preferably used from the viewpoint of increasing the homogeneity of raw materials in the mixture of the raw materials and the complexing agent and obtaining a high ionic conductivity. In addition, examples of the high-speed agitation type mixer include a vertical axis rotating type mixer and a lateral axis rotating type mixer, and mixers of any of these types may be used.

Examples of a shape of the impeller which is used in the mechanical agitation type mixer include an anchor type, a blade type, an arm type, a ribbon type, a multistage blade type, a double arm type, a shovel type, a twin-shaft blade type, a flat blade type, and a C type blade type. From the viewpoint of increasing the homogeneity of raw materials in the raw materials and obtaining a high ionic conductivity, a shovel type, a flat blade type, a C type blade type, and the like are preferred. Further, in the mechanical agitation type mixer, it is preferable to install a circulation line of discharging an object to be stirred to the outside of the mixer and then returning it to the inside of the mixer. As a result, a raw material having a high specific gravity, such as lithium halide, is stirred without sedimentation and/or retention, enabling more uniform mixing.

Although the installation location of the circulation line is not particularly limited, it is preferably installed at a location where an object is discharged from the bottom of the mixer and returned to the top of the mixer. In this way, it becomes easier to evenly agitate the raw materials, which tend to settle, by putting the raw materials on convection caused by circulation. Furthermore, it is preferable that a return port is located below the surface of the liquid to be stirred. In this way, it is possible to suppress the object to be stirred from splashing and adhering to the wall surface inside the mixer.

A temperature condition on the occasion of mixing the raw materials and the complexing agent is not particularly limited, and for example, it is −30 to 100° C., preferably −10 to 50° C., and more preferably around room temperature (23° C.) (for example, (room temperature)±about 5° C.). In addition, a mixing time is about 0.1 to 150 hours, and from the viewpoint of more uniformly mixing the raw material inclusion and the complexing agent, thereby obtaining a high ionic conductivity, the mixing time is preferably 1 to 120 hours, more preferably 4 to 100 hours, and still more preferably 8 to 80 hours.

By mixing the raw materials and the complexing agent, owing to an action of the lithium element, the sulfur element, the phosphorus element, and the halogen element, all of which are contained in the raw materials, with the complexing agent, a complex in which these elements are bound directly with each other via and/or not via the complexing agent is obtained. That is, in the method of producing a solid electrolyte of the present embodiment, the complex obtained through mixing of the raw materials and the complexing agent is constituted of the complexing agent, the lithium element, the sulfur element, the phosphorus element, and the halogen element. In the present embodiment, the resulting complex is not one completely dissolved in the complexing agent that is a liquid, and typically, since it is a solid, in the present embodiment, a complex and a suspension in which the complex is suspended in an optionally added solvent is obtained. In consequence, the method of producing a solid electrolyte of the present embodiment is corresponding to a heterogeneous system in a so-called liquid-phase method.

(Residual Amount of $Li_2S$)

In the present embodiment, the residual amount of $Li_2S$ at the time when the first step is completed is preferably 1.0% or more, more preferably 3.0% or more, and still more preferably 5.0% or more, and the upper limit is preferably 35.0% or less, more preferably 30.0% or less, and still more preferably 25.0% or less. By setting the residual amount of $Li_2S$ within the above range, it becomes easier to obtain a solid electrolyte having high ionic conductivity more efficiently.

As used herein, the term "residual amount of $Li_2S$" refers to an amount of unreacted $Li_2S$ in the reaction field when $Li_2S$ is used as a raw material, which is obtained by the method described in the Examples, and is a numerical value that serves as an index for grasping the progress of the reaction.

Further, the $Li_2S$ residual amount at the time when the second step is completed is preferably as small as possible, specifically preferably 20.0% or less, more preferably 15.0% or less, still more preferably 10.0% or less, further more preferably 5.0% or less, particularly preferably 2.5% or less.

According to the production method of the present embodiment, by sequentially using two different complexing agents 1 and 2, the residual amount of $Li_2S$ can be suppressed to an extremely small amount as described above, and thus it is possible to efficiently obtain a solid electrolyte having a high ionic conductivity.

[Drying]

The method of producing a solid electrolyte of the present embodiment may include a step of drying the obtained suspension after the second step. According to this, a powder of the electrolyte precursor is obtained. By performing drying in advance, it becomes possible to efficiently perform heating. The drying and the subsequent heating may be performed in the same process.

Drying can be performed at a temperature according to the kind of the complexing agent and solvent remaining in the complex. For example, the drying can be performed at a temperature of a boiling point of the complexing agent or solvent or higher. In addition, the drying can be performed through drying under reduced pressure (vacuum drying) by using a vacuum pump or the like at typically 5 to 100° C., preferably 10 to 85° C., more preferably 15 to 70° C., and still more preferably around room temperature (23° C.) (for example, (room temperature) about 5° C.), to volatilize the complexing agent and the solvent.

In addition, unlike the complexing agent, the solvent is difficult to be incorporated into the complex, so the solvent that can be contained in the complex is usually 3% by mass or less, preferably 2% by mass or less, and more preferably 1% by mass or less.

The drying may be performed by solid-liquid separation by means of filtration with a glass filter or the like, or decantation, or solid-liquid separation with a centrifuge or the like. In the present embodiment, after performing the solid-liquid separation, the drying may be performed under the aforementioned temperature condition.

Specifically, for the solid-liquid separation, decantation in which the suspension is transferred into a container, and after the solid is precipitated, the complexing agent and optionally added solvent as a supernatant are removed, or filtration with a glass filter having a pore size of, for example, about 10 to 200 μm, and preferably 20 to 150 μm, is easy.

The complex has such a characteristic feature that it is constituted of the complexing agent, the lithium element, the sulfur element, the phosphorus element, and the halogen element, and in the X-ray diffraction pattern in the X-ray diffractometry, peaks different from the peaks derived from the raw materials are observed, and it preferably contains a co-crystal constituted of the complexing agent, the lithium element, the sulfur element, the phosphorus element, and the halogen element. When only the raw materials are merely mixed, the peaks derived from the raw materials are merely observed, whereas when the raw materials and the complexing agent are mixed, peaks different from the peaks derived from the raw materials are observed. Thus, the complex (co-crystal) has a structure explicitly different from the raw materials themselves contained in the raw material inclusion. This matter is specifically confirmed in the section of Examples. Measurement examples of the X-ray diffraction patterns of the complex (co-crystal) and the respective raw materials, such as lithium sulfide, are shown in FIGS. 1 and 2, respectively. It is noted from the X-ray diffraction patterns that the complex (co-crystal) has a predetermined crystal structure. In addition, the diffraction pattern of the electrolyte precursor does not contain the diffraction patterns of any raw materials, such as lithium sulfide, as shown in FIG. 2, and thus, it is noted that the complex (co-crystal) has a crystal structure different from the raw materials.

In addition, the complex (co-crystal) has such a characteristic feature that it has a structure different from the crystalline solid electrolyte. This matter is also specifically confirmed in the section of Examples. The X-ray diffraction pattern of the crystalline solid electrolyte of Example 1 is also shown in FIG. 1, and it is noted that the foregoing diffraction pattern is different from the diffraction pattern of the complex (co-crystal). The complex (co-crystal) has the predetermined crystal structure and is also different from the amorphous solid electrolyte having a broad pattern as shown in FIG. 1.

The co-crystal is constituted of the complexing agent, the lithium element, the sulfur element, the phosphorus element, and the halogen element, and typically, it may be presumed that a complex structure in which the lithium element and the other elements are bound directly with each other via and/or not via the complexing agent is formed.

Here, the fact that the complexing agent constitutes the co-crystal can be, for example, confirmed through gas chromatography analysis. Specifically, the complexing agent contained in the co-crystal can be quantitated by dissolving a powder of the complex in methanol and subjecting the obtained methanol solution to gas chromatography analysis.

Although the content of the complexing agent in the complex varies with the molecular weight of the complexing agent, it is typically about 10% by mass or more and 70% by mass or less, and preferably 15% by mass or more and 65% by mass or less.

In the method of producing a solid electrolyte of the present embodiment, that the co-crystal containing the halogen element is formed is preferred from the standpoint of enhancing a high ionic conductivity. By using the complexing agent 1, $Li_3PS_4$, and the raw materials containing lithium and halogen, such as a lithium halide, are bound (coordinated) with each other via the complexing agent 1, the co-crystal in which the halogen element is more likely dispersed and fixed is readily obtained, and the ionic conductivity is enhanced.

The matter that the halogen element in the complex constitutes the co-crystal can be confirmed from the fact that even when the solid-liquid separation of the suspension is performed, the predetermined amount of the halogen element is contained in the complex. This is because the halogen element which does not constitute the co-crystal is easily eluted as compared with the halogen element constituting the co-crystal and discharged into the liquid of solid-liquid separation. In addition, the foregoing matter can also be confirmed from the fact that by performing composition analysis through ICP analysis (inductively coupled plasma atomic emission spectrophotometry) of the complex or solid electrolyte, a proportion of the halogen element in the electrolyte precursor or solid electrolyte is not remarkably lowered as compared with a proportion of the halogen element fed from the raw materials.

The amount of the halogen element remaining in the complex is preferably 30% by mass or more, more preferably 35% by mass or more, and still more preferably 40% by mass or more relative to the charged composition. An upper limit of the amount of the halogen element remaining in the complex is 100% by mass.

[Heating]

It is preferred that the method of producing a solid electrolyte of the present embodiment includes heating of the electrolyte precursor to obtain the amorphous solid electrolyte; and heating of the electrolyte precursor or amorphous solid electrolyte to obtain the crystalline solid electrolyte. In view of the fact that a step of heating of the electrolyte precursor is included, the complexing agent in the electrolyte precursor is removed, and the amorphous solid electrolyte and the crystalline solid electrolyte each containing the lithium element, the sulfur element, the phosphorus element, and the halogen element are obtained. Here, the fact that the complexing agent in the electrolyte precursor is removed is supported by the facts that in addition to the fact that it is evident from the results of the X-ray diffraction pattern, the gas chromatography analysis, and the like that the complexing agent constitutes the co-crystal of the electrolyte precursor, the solid electrolyte obtained by removing the complexing agent through heating of the electrolyte precursor is identical in the X-ray diffraction pattern with the solid electrolyte obtained by the conventional method without using the complexing agent.

In the production method of the present embodiment, the solid electrolyte is obtained by heating the electrolyte precursor to remove the complexing agent in the electrolyte precursor, and it is preferred that the content of the complexing agent in the solid electrolyte is low as far as possible. However, the complexing agent may be contained to an extent that the performance of the solid electrolyte is not impaired. The content of the complexing agent in the solid electrolyte may be typically 10% by mass or less, and it is preferably 5% by mass or less, more preferably 3% by mass or less, and still more preferably 1% by mass or less.

In the production method of the present embodiment, in order to obtain the crystalline solid electrolyte, it may be obtained by heating the electrolyte precursor, or it may be obtained by heating the electrolyte precursor to obtain the amorphous solid electrolyte and then heating the amorphous solid electrolyte. That is, in the production method of the present embodiment, the amorphous solid electrolyte can also be produced.

Conventionally, in order to obtain a crystalline solid electrolyte having a high ionic conductivity, for example, a solid electrolyte having a thio-LISICON Region II-type crystal structure as mentioned later, it was required that an amorphous solid electrolyte is prepared through mechanical pulverization treatment, such as mechanical milling, or other melt quenching treatment or the like, and then, the amorphous solid electrolyte is heated. However, it may be said that the production method of the present embodiment is superior to the conventional production method by mechanical milling treatment or the like from the standpoint that a crystalline solid electrolyte having a thio-LISICON Region II-type crystal structure is obtained even by a method of not performing mechanical pulverization treatment, other melt quenching treatment, or the like.

In the method of producing a solid electrolyte of the present embodiment, whether or not the amorphous solid electrolyte is obtained, whether or not the crystalline solid electrolyte is obtained, whether or not after obtaining the amorphous solid electrolyte, the crystalline solid electrolyte is obtained, or whether or not the crystalline solid electrolyte is obtained directly from the electrolyte precursor is appropriately selected according to the desire, and is able to be adjusted by the heating temperature, the heating time, or the like.

For example, in the case of obtaining the amorphous solid electrolyte, the heating temperature of the electrolyte precursor may be determined according to the structure of the crystalline solid electrolyte which is obtained by heating the amorphous solid electrolyte (or the electrolyte precursor). Specifically, the heating temperature may be determined by subjecting the amorphous solid electrolyte (or the electrolyte precursor) to differential thermal analysis (DTA) with a differential thermal analysis device (DTA device) under a temperature rise condition of 10° C./min and adjusting the temperature to a range of preferably 5° C. or lower, more preferably 10° C. or lower, and still more preferably 20° C. or lower starting from a peak top temperature of the exothermic peak detected on the lowermost temperature side. Although a lower limit thereof is not particularly restricted, it may be set to a temperature of about [(peak top temperature of the exothermic peak detected on the lowermost temperature side)−40° C.] or higher.

By regulating the heating temperature to such a temperature range, the amorphous solid electrolyte is obtained more efficiently and surely. Although the heating temperature for obtaining the amorphous solid electrolyte cannot be unequivocally prescribed because it varies with the structure of the resulting crystalline solid electrolyte, in general, it is preferably 135° C. or lower, more preferably 130° C. or lower, and still more preferably 125° C. or lower. Although a lower limit of the heating temperature is not particularly limited, it is preferably 90° C. or higher, more preferably 100° C. or higher, and still more preferably 110° C. or higher.

In the case of obtaining the crystalline solid electrolyte by heating the amorphous solid electrolyte or directly from the electrolyte precursor, the heating temperature may be determined according to the structure of the crystalline solid electrolyte, and it is preferably higher than the aforementioned heating temperature for obtaining the amorphous solid electrolyte. Specifically, the heating temperature may be determined by subjecting the amorphous solid electrolyte (or the electrolyte precursor) to differential thermal analysis (DTA) with a differential thermal analysis device (DTA device) under a temperature rise condition of 10° C./min and adjusting the temperature to a range of preferably 5° C. or higher, more preferably 10° C. or higher, and still more preferably 20° C. or higher starting from a peak top temperature of the exothermic peak detected on the lowermost temperature side. Although an upper limit thereof is not particularly restricted, it may be set to a temperature of about [(peak top temperature of the exothermic peak detected on the lowermost temperature side)+40° C.] or lower. By regulating the heating temperature to such a temperature range, the crystalline solid electrolyte is obtained more efficiently and surely. Although the heating temperature for obtaining the crystalline solid electrolyte cannot be unequivocally prescribed because it varies with the structure of the resulting crystalline solid electrolyte, in general, it is preferably 130° C. or higher, more preferably 135° C. or higher, and still more preferably 140° C. or lower. Although an upper limit of the heating temperature is not particularly limited, it is preferably 300° C. or lower, more preferably 280° C. or lower, and still more preferably 250° C. or lower.

Although the heating time is not particularly limited so long as it is a time for which the desired amorphous solid electrolyte or crystalline solid electrolyte is obtained, for example, it is preferably 1 minute or more, more preferably 10 minutes or more, still more preferably 30 minutes or more, and yet still more preferably 1 hour or more. In addition, though an upper limit of the heating temperature is not particularly restricted, it is preferably 24 hours or less, more preferably 10 hours or less, still more preferably 5 hours or less, and yet still more preferably 3 hours or less.

It is preferred that the heating is performed in an inert gas atmosphere (for example, a nitrogen atmosphere and an argon atmosphere) or in a reduced pressure atmosphere (especially, in vacuo). This is because deterioration (for example, oxidation) of the crystalline solid electrolyte can be prevented from occurring. Although a method for heating is not particularly limited, for example, a method of using a hot plate, a vacuum heating device, an argon gas atmosphere furnace, or a firing furnace can be adopted. In addition, industrially, a lateral dryer or a lateral vibration fluid dryer provided with a heating means and a feed mechanism, or the like may be selected according to the heating treatment amount.

[Amorphous Solid Electrolyte]

The amorphous solid electrolyte which is obtained by the method of producing a solid electrolyte of the present embodiment contains the lithium element, the sulfur element, the phosphorus element, and the halogen element. As representative examples thereof, there are preferably exemplified solid electrolytes constituted of lithium sulfide, phosphorus sulfide, and a lithium halide, such as $Li_2S$—$P_2S_5$—$LiI$, $Li_2S$—$P_2S_5$—$LiCl$, $Li_2S$—$P_2S_5$—$LiBr$, and $Li_2S$—$P_2S_5$—$LiI$—$LiBr$; and solid electrolytes further containing other element, such as an oxygen element and a silicon element, for example, $Li_2S$—$P_2S_5$—$Li_2O$—$LiI$ and $Li_2S$—$SiS_2$—$P_2S_5$—$LiI$. From the viewpoint of obtaining a higher ionic conductivity, solid electrolytes constituted of lithium sulfide, phosphorus sulfide, and a lithium halide, such as $Li_2S$—$P_2S_5$—$LiI$, $Li_2S$—$P_2S_5$—$LiCl$, $Li_2S$—$P_2S_5$—$LiBr$, and $Li_2S$—$P_2S_5$—$LiI$—$LiBr$, are preferred.

The kinds of the elements constituting the amorphous solid electrolyte can be confirmed by, for example, an inductivity coupled plasma optical emission spectrometer (ICP).

In the case where the amorphous solid electrolyte obtained in the method of producing a solid electrolyte of the present embodiment is one having at least $Li_2S$—$P_2S_5$, from the viewpoint of obtaining a higher ionic conductivity, a molar ratio of $Li_2S$ to $P_2S_5$ is preferably (65 to 85)/(15 to 35), more preferably (70 to 80)/(20 to 30), and still more preferably (72 to 78)/(22 to 28).

In the case where the amorphous solid electrolyte obtained in the method of producing a solid electrolyte of the present embodiment is $Li_2S$—$P_2S_5$—LiI—LiBr, the total content of lithium sulfide and diphosphorus pentasulfide is preferably 60 to 95 mol %, more preferably 65 to 90 mol %, and still more preferably 70 to 85 mol %. In addition, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the amorphous solid electrolyte obtained in the method of producing a solid electrolyte of the present embodiment, a blending ratio (molar ratio) of lithium element to sulfur element to phosphorous element to halogen element is preferably (1.0 to 1.8)/(1.0 to 2.0)/(0.1 to 0.8)/(0.01 to 0.6), more preferably (1.1 to 1.7)/(1.2 to 1.8)/(0.2 to 0.6)/(0.05 to 0.5), and still more preferably (1.2 to 1.6)/(1.3 to 1.7)/(0.25 to 0.5)/(0.08 to 0.4). In addition, in the case of using a combination of bromine and iodine as the halogen element, a blending ratio (molar ratio) of lithium element to sulfur element to phosphorus element to bromine to iodine is preferably (1.0 to 1.8)/(1.0 to 2.0)/(0.1 to 0.8)/(0.01 to 0.3)/(0.01 to 0.3), more preferably (1.1 to 1.7)/(1.2 to 1.8)/(0.2 to 0.6)/(0.02 to 0.25)/(0.02 to 0.25), still more preferably (1.2 to 1.6)/(1.3 to 1.7)/(0.25 to 0.5)/(0.03 to 0.2)/(0.03 to 0.2), and yet still more preferably (1.35 to 1.45)/(1.4 to 1.7)/(0.3 to 0.45)/(0.04 to 0.18)/(0.04 to 0.18). By allowing the blending ratio (molar ratio) of lithium element to sulfur element to phosphorus element to halogen element to fall within the aforementioned range, it becomes easy to provide a solid electrolyte having a thio-LISICON Region II-type crystal structure as mentioned later and having a higher ionic conductivity.

Although the shape of the amorphous solid electrolyte is not particularly restricted, examples thereof include a granular shape. The average particle diameter ($D_{50}$) of the granular amorphous solid electrolyte is, for example, within a range of 0.01 to 500 μm, and further in a range of 0.1 to 200 μm.

[Crystalline Solid Electrolyte]

The crystalline solid electrolyte obtained by the method of producing a solid electrolyte of the present embodiment may be a so-called glass ceramics which is obtained by heating the amorphous solid electrolyte to a crystallization temperature or higher. Examples of a crystal structure thereof include an $Li_3PS_4$ crystal structure, an $Li_4P_2S_6$ crystal structure, an $Li_7PS_6$ crystal structure, an $Li_7P_3S_1$ crystal structure, and a crystal structure having peaks at around of $2\theta=20.2°$ and 23.6° (see, for example, JP 2013-16423 A).

In addition, examples thereof include an $Li_{4-x}Ge_{1-x}P_xS_4$-based thio-LISICON Region II-type crystal structure (see Kanno, et al., Journal of The Electrochemical Society, 148 (7) A742-746 (2001)) and a crystal structure similar to the $Li_{4-x}Ge_{1-x}P_xS_4$-based thio-LISICON Region II-type crystal structure (see Solid State Ionics, 177 (2006), 2721-2725). Among them, the thio-LISICON Region II-type crystal structure is preferred as the crystal structure of the crystalline solid electrolyte obtained by the present production method from the standpoint that a higher ionic conductivity is obtained. Here, the "thio-LISICON Region II-type crystal structure" expresses any one of an $Li_{4-x}Ge_{1-x}P_xS_4$-based thio-LISICON Region II-type crystal structure and a crystal structure similar to the $Li_{4-x}Ge_{1-x}P_xS_4$-based thio-LISICON Region II-type crystal structure.

In addition, though the crystalline solid electrolyte obtained by the method of producing a solid electrolyte of the present embodiment may be one containing the aforementioned thio-LISICON Region II-type crystal structure or may be one containing the thio-LISICON Region II-type crystal structure as a main crystal, it is preferably one containing the thio-LISICON Region II-type crystal structure as a main crystal from the viewpoint of obtaining a higher ionic conductivity. In this specification, the wording "containing as a main crystal" means that a proportion of the crystal structure serving as an object in the crystal structure is 80% or more, and it is preferably 90% or more, and more preferably 95% or more. In addition, from the viewpoint of obtaining a higher ionic conductivity, the crystalline solid electrolyte obtained by the method of producing a solid electrolyte of the present embodiment is preferably one not containing crystalline $Li_3PS_4$ ($\beta$-$Li_3PS_4$).

In the X-ray diffractometry using a CuKα ray, the $Li_3PS_4$ crystal structure gives diffraction peaks, for example, at around $2\theta=17.50, 18.3°, 26.1°, 27.3°,$ and 30.0°; the $Li_4P_2S_6$ crystal structure gives diffraction peaks, for example, at around $2\theta=16.9°, 27.1°,$ and 32.5°; the $Li_7PS_6$ crystal structure gives diffraction peaks, for example, at around $2\theta=15.3°, 25.2°, 29.6°,$ and 31.0°; the $Li_7P_3S_{11}$ crystal structure gives diffraction peaks, for example, at around $2\theta=17.8°, 18.5°, 19.7°, 21.8°, 23.7°, 25.9°, 29.6°,$ and 30.0°; the $Li_{4-x}Ge_{1-x}P_xS_4$-based thio-LISICON Region II-type crystal structure gives diffraction peaks, for example, at around $2\theta=20.1°, 23.9°,$ and 29.5°; and the crystal structure similar to the $Li_{4-x}Ge_{1-x}P_xS_4$-based thio-LISICON Region II-type crystal structure gives diffraction peaks, for example, at around $2\theta=20.2°$ and 23.6°. The position of these peaks may vary within a range of 0.5°.

As mentioned above, in the case when the thio-LISICON Region II-type crystal structure is obtained in the present embodiment, the foregoing crystal structure is preferably one not containing crystalline $Li_3PS_4$ ($\beta$-$Li_3PS_4$). FIG. 1 or the like shows an X-ray diffractometry example of the crystalline solid electrolyte obtained by the production method of the present embodiment. In addition, FIG. 2 shows an X-ray diffractometry example of crystalline $Li_3PS_4$ ($\beta$-$Li_3PS_4$).

As grasped from FIGS. 1 and 2, etc., the solid electrolyte of the present embodiment does not have diffraction peaks at $2\theta=17.5°$ and 26.1°, or even in the case where it has diffraction peaks, extremely small peaks as compared with the diffraction peaks of the thio-LISICON Region II-type crystal structure are merely detected. In the present embodiment, the resulting solid electrolyte preferably does not contain crystalline $Li_3PS_4$ ($\beta$-$Li_3PS_4$) as described above. That is, the resulting solid electrolyte preferably does not have a diffraction peak at $2\theta=17.5°$ and 26.1° seen in crystalline $Li_3PS_4$.

The crystal structure represented by a compositional formula $Li_{7-x}P_{1-y}Si_yS_6$ or $Li_{7+x}P_{1-y}Si_yS_6$ (x is −0.6 to 0.6, and y is 0.1 to 0.6), which has the aforementioned structure skeleton of $Li_7PS_6$ and in which a part of P is substituted with Si, is a cubic crystal or a rhombic crystal, and is preferably a cubic crystal, and in X-ray diffractometry using a CuKα ray, the crystal structure gives peaks appearing mainly at $2\theta=15.5°, 18.0°, 25.0°, 30.0°, 31.4°, 45.3°, 47.0°,$ and 52.0°. The crystal structure represented by the aforementioned compositional formula $Li_{7-x-2y}PS_{6-x-y}$ $Cl_x$ $(0.8\leq x\leq1.7,$ and $0<y\leq(-0.25x+0.5))$ is preferably a cubic crystal, and in the X-ray diffractometry using a CuKα ray, the crystal structure gives peaks appearing mainly at $2\theta=15.5°, 18.0°, 25.0°, 30.0°, 31.4°, 45.3°, 47.0°,$ and 52.0°.

In addition, the crystal structure represented by the afore-mentioned compositional formula $Li_{7-x}PS_{6-x}Ha_x$ (Ha represents Cl or Br, and x is preferably 0.2 to 1.8) is preferably a cubic crystal, and in the X-ray diffractometry using a CuKα ray, the crystal structure gives peaks appearing mainly at $2\theta$=15.5°, 18.0°, 25.0°, 30.0°, 31.4°, 45.3°, 47.0°, and 52.0°.

These peak positions may vary within a range of 0.5°.

Although the shape of the crystalline solid electrolyte is not particularly restricted, examples thereof include a granular shape. The average particle diameter ($D_{50}$) of the granular crystalline solid electrolyte is, for example, within a range of 0.01 to 500 μm, and further in a range of 0.1 to 200 μm.

EXAMPLES

Next, the present invention is described specifically with reference to Examples, but it should be construed that the present invention is by no means restricted by these Examples.
(Measurement of Powder XRD Diffraction and Residual Amount of $Li_2S$)

Powder X-ray diffractometry (XRD) and calculation of the residual amount of $Li_2S$ in the solid electrolyte were carried out as follows.

Amorphous solid electrolyte powders obtained in Examples and Comparative Examples were filled into a groove having a diameter of 20 mm and a depth of 0.2 mm and were leveled with glass to prepare samples. The samples were sealed with a Kapton film for XRD and measured under the following conditions without exposure to air. When measuring the residual amount of $Li_2S$ after adding the complexing agent 1 and stirring, 10 ml of slurry after adding the complexing agent 1 and stirring (before adding the complexing agent 2 in the case where the complexing agent 2 was added) was withdrawn and dried at room temperature under reduced pressure to obtain a powdery electrolyte precursor, which was subjected to reduced pressure at 110° C. for 2 hours to obtain an amorphous solid electrolyte. In addition, the powder X-ray diffractometry (XRD) of the raw materials used in the Examples was also performed in the same manner as for the amorphous solid electrolyte.
Measuring apparatus: D2 PHASER, manufactured by Bruker
   Tube voltage: 30 kV
   Tube current: 10 mA
   X-ray wavelength: Cu-Kα ray (1.5418 Å)
   Optical system: Concentration method
   Slit configuration: Solar slit 4°, divergence slit 1 mm, Kβ filter (Ni plate) used
   Detector: Semiconductor detector
   Measuring range: $2\theta$=10-60 deg
   Step width, scan speed: 0.05 deg, 0.05 deg/sec
Analysis was performed using an Excel solver function to confirm the residual amount of raw materials from the measurement results. $2\theta$ of the raw data was set as A, a peak intensity was set as B, and baseline and glass strength used for calculation were set as C and D, respectively. When calculating the peak intensity at the time of calculating the baseline, it was empirically calculated as follows for each $2\theta$ using the measurement system.

$$C=-45.72*A+4600-457.2$$

The glass strength D was calculated by the following equation, where E, F, G and H are peak angles, I, J, K and L are widths, and M, N, O and P are strengths.

$$D=Mxe^{\{-((A-E)^2/I^2/2)\}\sqrt{2\pi}/I}+$$
$$Nxe^{\{-((A-F)^2/J^2/2)\}\sqrt{2\pi}/J}+$$
$$Oxe^{\{-((A-G)^2/K^2/2)\}\sqrt{2\pi}/K}+Pxe^{\{-((A-H)^2/L^2/2)\}\sqrt{2\pi}/L}$$

Moreover, assuming that the background correction data for calculation is Q, then it is as follows.

$$Q=B-C$$

A peak position of the raw material $Li_2S$ at the initial stage of the reaction and the calculated peak shift of the $Li_2S$ peak were set as R, and R was added to all the peaks and reflected in the above Q. Also, the peak intensity of $Li_2S$ at the initial stage of the reaction was set to S, and the peak intensity was fitted by multiplying the peak intensity S at the initial stage of the reaction by a coefficient T. Assuming that a sum of the fitting residuals is U, then it is as follows.

$$U=\Sigma(Q-TxS-C)$$

In the calculation using the solver function, the calculation was performed such that E, F, G, H, I, J, K, L, M, N, O, P, R, and T were variables and U was minimized in GRG nonlinearity, and the $Li_2S$ residual amount was fitted.
(Measurement of Ionic Conductivity)

In the present Example, the measurement of the ionic conductivity was performed in the following manner.

From the crystalline solid electrolyte obtained in Examples and Comparative Examples, a circular pellet having a diameter of 10 mm (cross-sectional area S: 0.785 $cm^2$) and a height (L) of 0.1 to 0.3 cm was molded to prepare a sample. From the top and the bottom of the sample, electrode terminals were taken, and the ion conductivity was measured at 25° C. according to an alternate current impedance method (frequency range: 5 MHz to 0.5 Hz, amplitude: 10 mV) to give a Cole-Cole plot. In the vicinity of the right end of the arc observed in the high-frequency side region, a real number part Z' (Ω) at the point at which −Z" (Ω) is the smallest was referred to as a bulk resistance R (Ω) of the electrolyte, and according to the following equation, the ion conductivity σ(S/cm) was calculated.

$$R=\rho(L/S)$$

$$\sigma=1/\rho$$

Production Example 1

Into a stirring bar-containing Schlenk flask (capacity: 500 mL), 15.87 g of lithium sulfide ($Li_2S$) as a compound satisfying (1) were introduced in a nitrogen atmosphere. After rotating the stirring bar, 300 mL of cyclohexane was added, then 6.26 g of iodine ($I_2$) was added as a compound satisfying (1), and the mixture was stirred at room temperature for 2 hours. Thereafter, 3.94 g of bromine ($Br_2$) was added as a compound satisfying (1), and the mixture was stirred at room temperature for 12 hours and further stirred at 50° C. for 3 hours. The slurry was allowed to stand to settle the solid content, and after removing 190 mL of a supernatant, 190 mL of cyclohexane was added. The decantation was performed three times to obtain a cyclohexane slurry containing lithium sulfide, lithium iodide and lithium bromide.

Production Example 2: Production of $Li_3PS_4$-TMEDA Complex

Under an inert gas atmosphere in a glove box, a total of 10 g of lithium sulfide ($Li_2S$) and diphosphorus pentasulfide ($P_2S_5$) were weighed in a stirring bar-containing Schlenk flask such that the molar ratio of lithium sulfide ($Li_2S$) and diphosphorus pentasulfide ($P_2S_5$) was 3:1, and the mixture was cooled with an acetone-liquid nitrogen mixture. After cooling for 30 minutes, in a state of stirring with a stirring bar, 100 mL of tetrahydrofuran (THF) was added while inert gas was flowing, and the mixture was further stirred for 3 days. The resulting slurry was filtered, the resulting solid was washed with THF five times, and the solvent was vacuum-dried to obtain a $Li_3PS_4$-3THF complex. The complex was vacuum-dried at 90° C. for 5 hours to obtain amorphous g-$Li_3PS_4$. In a glove box, under an inert gas atmosphere, 5 g of the g-$Li_3PS_4$ was weighed into a stirring bar-containing Schlenk bottle, and 20 mL of N,N,N,N-tetramethylethane-1,2-diamine (N,N,N,N-tetramethylethylenediamine, TMEDA) were added and stirred while inert gas was flowing. After reacting for 3 days, the solvent was vacuum-dried (at room temperature) to obtain a $Li_3PS_4$-TMEDA complex.

Production Example 3: Production of LiI-TMEDA Complex

LiI-TMEDA complex was produced in the same manner as in the Production Example 2 above, except that 5 g of LiI was weighed instead of g-$Li_3PS_4$ and the solvent was vacuum-dried (at room temperature) and then dried at 100° C. in the Production Example 2 above.

(FT-IR Analysis (Diffusion Reflection Method))

The complexes obtained in Production Examples 2 and 3 above and TMEDA were analyzed by the following method. The analysis results are shown in FIG. 7.

- Measurement apparatus: FT-IR spectrometer "FT/IR-6200", manufactured by JASCO Corporation
- Measurement method: Diffuse reflection method
- Measurement wavenumber range: 400 to 4000 cm-1
- Light source: High brightness ceramics light source (halogen lamp)
- Detector: DLATGS
- Resolution: 4 cm-1
- Measurement time: 1.2 seconds/time
- Number of accumulated times: 100 times
- Measurement conditions: Measured using a KBr diffuse reflection cell

Example 1

To the slurry containing lithium sulfide, lithium iodide, and lithium bromide, which are compounds satisfying (1), obtained in Production Example 1, 21.93 g of diphosphorus pentasulfide ($P_2S_5$) and 100 mL of cyclohexane were added and transferred to a 500 mL separable flask equipped with a rotary impeller and a circulation line. Then 103 mL of tetramethylethylenediamine (complexing agent 1) was added thereto, and mixing (first step) was started by circulation stirring at room temperature at a rotor speed of 200 rpm of the rotary impeller and a pump flow rate of 550 mL/min. After 48 hours, the residual amount of $Li_2S$ after mixing in the first step was 22%. Then, 48 mL of tetrahydrofuran (complexing agent 2, hereinafter also referred to as "THF") (an amount of a molar ratio of 3 to the assumed amount of $Li_3PS_4$ obtained from the above raw materials) was added, and mixing (second step) was performed by continuing circulation stirring for an additional 24 hours, and the resulting slurry was dried under reduced pressure at room temperature to obtain a powdery electrolyte precursor.

Then, the pressure was reduced at 110° C. for 2 hours to obtain an amorphous solid electrolyte.

When the obtained amorphous solid electrolyte was subjected to XRD measurement, it was confirmed that there were no peaks other than peaks derived from the electrolyte precursor and raw materials in an X-ray diffraction spectrum. The X-ray diffraction spectrum is shown in FIG. 1. Further, the residual amount of $Li_2S$ after mixing in the second step was calculated and found to be 1%.

Further, the amorphous solid electrolyte was decompressed at 200° C. for 2 hours to obtain a crystalline solid electrolyte. XRD measurement was performed on the obtained crystalline solid electrolyte. The results are shown in FIG. 1. In the X-ray diffraction spectrum of the crystalline solid electrolyte, crystallization peaks were mainly detected at $2\theta=20.2°$ and $23.6°$, and the crystalline solid electrolyte was confirmed to have a thio-LISICON Region II-type crystal structure and have no diffraction peaks at $2\theta=17.5°$ and $26.1°$. The ionic conductivity of the crystalline solid electrolyte was measured and found to be $3.96 \times 10^{-3}$ (S/cm), and the crystalline solid electrolyte was confirmed to have a high ionic conductivity. The results are shown in FIG. 1.

Examples 2 to 5

An electrolyte precursor, an amorphous solid electrolyte and a crystalline solid electrolyte were obtained in the same manner as in Example 1, except that the amount of solvent added, the mixing time in the first step, the type and amount of the complexing agent 2 added, and the mixing time in the second step in Example 1 were as shown in Table 1. In addition, regarding the residual amount of $Li_2S$ after adding and mixing the complexing agent 1 (after mixing in the first step) and the amorphous solid electrolyte finally obtained (after mixing in the second step), the residual amount of $Li_2S$ was calculated in the same manner as in Example 1. Further, XRD measurement and ionic conductivity measurement were performed in the same manner as in Example 1 for the obtained crystalline solid electrolyte. The results of Examples 2 to 5 are shown in Table 1, and the results of XRD measurement of Examples 2, 4 and 5 are shown in FIGS. 3 to 5, respectively.

In the X-ray diffraction spectrum of the electrolyte precursor obtained in the present Example, peaks different from the peaks derived from the used raw materials were observed, and an X-ray diffraction pattern different from those of the amorphous solid electrolyte and the crystalline solid electrolyte was shown. In addition, the raw materials used in this Example 1 (lithium bromide and lithium iodide) and the raw materials used in other Examples (lithium sulfide, diphosphorus pentasulfide), as well as amorphous $Li_3PS_4$ and crystalline $Li_3PS_4$ prepared as reference of X-ray diffraction patterns, were also subjected to powder X-ray diffractometry (XRD), and X-ray diffraction spectra are shown in FIG. 2. The X-ray diffraction spectrum of the electrolyte precursor showed an X-ray diffraction pattern different from the X-ray diffraction spectra of the raw materials.

In the X-ray diffraction spectrum of the amorphous solid electrolyte, any peak other than the peaks derived from the raw materials was confirmed to be absent.

Comparative Example 1

An electrolyte precursor and an amorphous solid electrolyte were obtained in the same manner as in Example 1, except that 150 mL of cyclohexane was used and the circulation stirring was continued for 30 hours without adding the complexing agent 2 in Example 1. The residual amount of $Li_2S$ in the obtained amorphous solid electrolyte was calculated in the same manner as in Example 1 and was found to be 37%, confirming that the synthesis reaction did not proceed sufficiently. The results are shown in Table 1.

Comparative Example 2

An electrolyte precursor and an amorphous solid electrolyte were obtained in the same manner as in Comparative Example 1, except that the circulation stirring time in Comparative Example 1 was changed to 48 hours. The residual amount of $Li_2S$ in the obtained amorphous solid electrolyte was calculated in the same manner as in Example 1. The results are shown in Table 1.

Comparative Example 3

An electrolyte precursor and an amorphous solid electrolyte were obtained in the same manner as in Comparative Example 1, except that the circulation stirring time in Comparative Example 1 was changed to 72 hours. The residual amount of $Li_2S$ in the obtained amorphous solid electrolyte was calculated in the same manner as in Example 1. The results are shown in Table 1.

diffractometry (XRD) and ionic conductivity measurement were carried out in the same manner as in Example 1 for the obtained crystalline solid electrolyte. The results are shown in FIG. 6 and Table 1.

Comparative Example 6

Into a stirring bar-containing Schlenk flask (capacity: 100 mL), 1.17 g of lithium sulfide ($Li_2S$), 1.89 g of diphosphorus pentasulfide ($P_2S_5$), 0.37 g of lithium bromide (LiBr), and 0.57 g of lithium iodide (LiI) were introduced in a nitrogen atmosphere. After rotating the stirring bar, 40 mL of cyclohexane was added, and then 4.1 mL of THF was added. As a result, the solid content in the slurry precipitated and aggregated, resulting in poor stirring and difficulty in continuing stirring.

Comparative Example 7

The same operation as in Comparative Example 6 was performed except that 1.8 mL of DME was used instead of THF in Comparative Example 6. As a result, the solid content in the slurry precipitated and aggregated, resulting in poor stirring and difficulty in continuing stirring.

TABLE 1

| | | Solvent | | Complexing agent 1 | | Mixing (first step) | | Complexing agent 2 | | | Mixing (second step) | | Total | Ionic |
|---|---|---|---|---|---|---|---|---|---|---|---|---|---|---|
| | | Type | Adding amount (mL) | Type | Adding amount (mL) | Mixing time (hr) | Li₂S residual amount (%) | Type | Adding amount (mL) | amount (molar ratio *1) | Mixing time (hr) | Li₂S residual amount (%) | mixing time (hr) | con— ductivity (mS/cm) |
| Exam— ples | 1 | Cyclohexane | 100 | TMEDA | 103 | 48 | 22 | THF | 48 | 3 | 24 | 1 | 72 | 3.96 |
| | 2 | Cyclohexane | 130 | TMEDA | 103 | 48 | 21 | THF | 16 | 1 | 92 | 2 | 140 | 3.53 |
| | 3 | Cyclohexane | 100 | TMEDA | 103 | 30 | 37 | THF | 48 | 3 | 42 | 15 | 72 | — |
| | 4 | Cyclohexane | 80 | TMEDA | 103 | 48 | 17 | DME | 61 | 3 | 24 | 1 | 72 | 3.68 |
| | 5 | Cyclohexane | 80 | TMEDA | 103 | 48 | 18 | EA | 58 | 3 | 24 | 2 | 72 | 3.39 |
| Com— parative Exam— ples | 1 | Cyclohexane | 150 | TMEDA | 103 | 30 | — | — | — | — | — | 37 | 30 | — |
| | 2 | Cyclohexane | 150 | TMEDA | 103 | 48 | — | — | — | — | — | 22 | 48 | — |
| | 3 | Cyclohexane | 150 | TMEDA | 103 | 72 | — | — | — | — | — | 20 | 72 | — |
| | 4 | Cyclohexane | 150 | TMEDA | 103 | 140 | — | — | — | — | — | 5 | 140 | — |
| | 5 | Cyclohexane | 150 | TMEDA | 103 | 300 | — | — | — | — | — | 2 | 300 | 2.12 |

*1 molar ratio with respect to $Li_3PA_4$.
*2 DME (dimethoxyethane)
*3 EA (ethyl acetate)

Comparative Example 4

An electrolyte precursor and an amorphous solid electrolyte were obtained in the same manner as in Comparative Example 1, except that the circulation stirring time in Comparative Example 1 was changed to 140 hours. The residual amount of $Li_2S$ in the obtained amorphous solid electrolyte was calculated in the same manner as in Example 1. The results are shown in Table 1.

Comparative Example 5

An electrolyte precursor and an amorphous solid electrolyte were obtained in the same manner as in Comparative Example 1, except that the circulation stirring time in Comparative Example 1 was changed to 300 hours. The residual amount of $Li_2S$ in the obtained amorphous solid electrolyte was calculated in the same manner as in Example 1. The results are shown in Table 1. Moreover, powder X-ray

INDUSTRIAL APPLICABILITY

According to the method of producing a solid electrolyte of the present embodiment, a crystalline solid electrolyte having a high ionic conductivity can be produced. The crystalline solid electrolyte obtained by the production method of the present embodiment is suitably used for batteries, especially batteries for information-related instruments, communication instruments, and so on, such as personal computers, video cameras and mobile phones.

The invention claimed is:

1. A method of producing a solid electrolyte comprising a lithium element, a sulfur element, a phosphorus element and a halogen element, said method comprising a first step of mixing two or more compounds satisfying (1) and a complexing agent 1 satisfying (2), and a second step of further mixing in a complexing agent 2 satisfying (3) after the first step:

(1) a compound containing one or more selected from the group consisting of a lithium element, a sulfur element, a phosphorus element and a halogen element;

(2) a complexing agent 1 capable of forming a complex containing $Li_3PS_4$ and a halogen element, wherein the complexing agent 1 contains a nitrogen element;

(3) a complexing agent 2 other than the complexing agent 1, capable of forming a complex containing $Li_3PS_4$, wherein the complexing agent 2 contains an oxygen element; and wherein said two or more compounds satisfying (1), taken together, comprise all of a lithium element, a sulfur element, a phosphorus element and a halogen element.

2. The method of producing a solid electrolyte according to claim 1, wherein the complexing agent 1 has two or more amino groups.

3. The method of producing a solid electrolyte according to claim 1, wherein the complexing agent 2 has one or more groups selected from a group consisting of an ether group and an ester group.

4. The method of producing a solid electrolyte according to claim 1, wherein the complexing agent 1 is tetramethylethylenediamine.

5. The method of producing a solid electrolyte according to claim 1, wherein the complexing agent 2 is tetrahydrofuran.

6. The method of producing a solid electrolyte according to claim 1, wherein the complexing agent 2 is dimethoxyethane.

7. The method of producing a solid electrolyte according to claim 1, wherein the complexing agent 1 is added in an amount with a molar ratio of 0.1 or more and 2.0 or less with respect to a total molar amount of Li atoms contained in two or more compounds satisfying (1).

8. The method of producing a solid electrolyte according to claim 1, wherein the complexing agent 2 is added in an amount with a molar ratio of 1.0 or more and 5.0 or less with respect to a total molar amount of $Li_3PS_4$ that can be produced from two or more compounds satisfying (1).

9. The method of producing a solid electrolyte according to claim 1, wherein a compound satisfying (1) contains lithium halide.

10. The method of producing a solid electrolyte according to claim 1, wherein a compound satisfying (1) contains a single halogen.

11. The method of producing a solid electrolyte according to claim 1, wherein the halogen element is a bromine element and an iodine element.

12. The method of producing a solid electrolyte according to claim 1, wherein a compound satisfying (1) includes lithium sulfide and diphosphorus pentasulfide.

13. The method of producing a solid electrolyte according to claim 1, wherein a compound satisfying (1) includes $Li_3PS_4$.

14. The method of producing a solid electrolyte according to claim 1, wherein pulverization mixing is not performed in the first step.

15. The method of producing a solid electrolyte according to claim 1, wherein the solid electrolyte contains a thio-LISICON Region II-type crystal structure.

16. The method of producing a solid electrolyte according to claim 1, wherein the solid electrolyte does not have diffraction peaks at $2\theta=17.5°$ and $26.1°$ in an X-ray diffractometry using a $CuK\alpha$ ray.

* * * * *